US011307914B2

(12) United States Patent
Jin

(10) Patent No.: US 11,307,914 B2
(45) Date of Patent: Apr. 19, 2022

(54) METHOD AND DEVICE FOR MANAGING APPLICATION PROGRAM

(71) Applicant: HUAWEI TECHNOLOGIES CO., LTD., Guangdong (CN)

(72) Inventor: Weisheng Jin, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/823,047

(22) Filed: Mar. 18, 2020

(65) Prior Publication Data
US 2020/0218590 A1 Jul. 9, 2020

Related U.S. Application Data

(63) Continuation of application No. PCT/CN2018/104025, filed on Sep. 4, 2018.

(30) Foreign Application Priority Data

Sep. 19, 2017 (CN) .......................... 201710852528.5

(51) Int. Cl.
G06F 3/00 (2006.01)
G06F 9/54 (2006.01)
G06F 9/445 (2018.01)

(52) U.S. Cl.
CPC .......... *G06F 9/548* (2013.01); *G06F 9/44505* (2013.01); *G06F 9/44584* (2013.01)

(58) Field of Classification Search
CPC ....................................................... G06F 9/54
(Continued)

(56) References Cited

U.S. PATENT DOCUMENTS

2012/0011501 A1* 1/2012 Filali-Adib ......... G06F 9/45558
718/1
2013/0346465 A1 12/2013 Maltz et al.
(Continued)

FOREIGN PATENT DOCUMENTS

CN 102947790 A 2/2013
CN 103023981 A 4/2013
(Continued)

OTHER PUBLICATIONS

Roberto Toldo, Global registration of multiple point clouds embedding the Generalized Procrustes Analysis into an ICP framework. (Year: 2010).*
(Continued)

Primary Examiner — Lechi Truong
(74) Attorney, Agent, or Firm — Womble Bond Dickinson (US) LLP

(57) ABSTRACT

A method and device for managing an application program are provided. The method includes: obtaining, by a first edge computing platform, an application program component of the first edge computing platform and an application program component of a second edge computing platform, where the application program component of the first edge computing platform and the application program component of the second edge computing platform are application program components in a global application program; and sending the application program component of the second edge computing platform to the second edge computing platform. The second edge computing platform installs the application program component of the second edge computing platform, thereby implementing a deployment of application programs between all levels of edge computing platforms.

18 Claims, 11 Drawing Sheets

(58) Field of Classification Search
USPC .......................................................... 719/310
See application file for complete search history.

(56) References Cited

U.S. PATENT DOCUMENTS

2016/0360339 A1* 12/2016 Yuan .................... H04L 67/104
2016/0366244 A1   12/2016 Chiu et al.
2018/0270780 A1    9/2018 Xiong et al.
2020/0099614 A1*  3/2020 Vutharkar ............. G06F 16/245

FOREIGN PATENT DOCUMENTS

| CN | 104395889 A | 3/2015 |
| CN | 106254408 A | 12/2016 |
| CN | 107018539 A | 8/2017 |
| EP | 3373523 A1 | 9/2018 |
| EP | 3373542 A1 | 9/2018 |
| WO | 2017066945 A1 | 4/2017 |
| WO | 2017091934 A1 | 6/2017 |
| WO | 2017091960 A1 | 6/2017 |
| WO | 2017129742 A1 | 8/2017 |

OTHER PUBLICATIONS

Natasha Gude, NOX: Towards an Operating System for Networks. (Year: 2008).*
Franck Le, Minerals: Using Data Mining to Detect Router Misconfigurations. (Year: 2006).*
ETSL white:"Mobile Edge Computing A key technology towards 5G", Sep. 2015,total 16 pages.
Mobile Edge Computing,Sep. 2014,total 36 pages.

* cited by examiner

METHOD AND DEVICE FOR MANAGING APPLICATION PROGRAM

CROSS-REFERENCE TO RELATED APPLICATIONS

This application is a continuation of International Application No. PCT/CN2018/104025, filed on Sep. 4, 2018, which claims priority to Chinese Patent Application No. 201710852528.5, filed on Sep. 19, 2017. The disclosures of the aforementioned applications are herein incorporated by reference in their entireties.

TECHNICAL FIELD

This application relates to the field of communications technologies, and in particular, to a method and device for managing an application program.

BACKGROUND

Enhanced mobile broadband (eMBB) services such as an augmented reality (AR) technology/virtual reality (VR) technology, a high-definition video (video on demand and live broadcast), a mobile game, a vehicular network, and the like, or emerging vertical industry services propose a new requirement on the conventional mobile network bandwidth and the latency. In such a large background, a mobile edge computing (MEC) technology becomes a new technology research direction to which attention is widely paid, and the technology can reduce a transmission path of an application service data flow, thereby improving service experience of users.

Currently, the European telecommunications standards institute (ETSI) defines an application scenario and a platform system architecture that are of the MEC, and a signaling process of modules in the system architecture. However, the existing MEC technology only provides virtualized computing, storage, and network resources at an edge location, and application functions and deployments of services are not involved.

SUMMARY

This application provides a method and device for managing an application program, to implement a deployment of application programs in an edge computing platform.

According to a first aspect, an embodiment of this application provides a method for managing an application program, including: obtaining, by a first edge computing platform, an application program component of the first edge computing platform and an application program component of a second edge computing platform, where the application program component of the first edge computing platform and the application program component of the second edge computing platform are application program components in a global application program; and sending the application program component of the second edge computing platform to the second edge computing platform, so that the second edge computing platform creates the application program component of the second edge computing platform. By using solutions provided in this embodiment, both the first edge computing platform and the second edge computing platform may obtain a respective application program component, thereby implementing the deployment of the application programs between all levels of edge computing platforms.

In one embodiment, before the obtaining, by a first edge computing platform, an application program component of the first edge computing platform and an application program component of a second edge computing platform, the method further includes: obtaining, by the first edge computing platform, registration information sent from the second edge computing platform, where the registration information includes one piece of the following information or any combination thereof: an identity of the second edge computing platform, a type of a device in which the second edge computing platform is located, a model of the device, a capability of the device, a function of the device, a communications module identity of the device, and location information of the device in a network. Therefore, a registration of the second edge computing platform is completed by the first edge computing platform, to enable the first edge computing platform to send the application program component of the second edge computing platform to the second edge computing platform.

In one embodiment, the method further includes: allocating, by the first edge computing platform, an identity to an instance corresponding to the global application program; and sending an instance identity corresponding to the global application program to the second edge computing platform. By using the instance identity corresponding to the global application program, the second edge computing platform may be enabled to associate identities.

In one embodiment, the method further includes: creating, by the first edge computing platform, an application program component instance of the first edge computing platform, and allocating an identity to the application program component instance of the first edge computing platform. By creating the application program component instance of the first edge computing platform and allocating the identity, an application program component instance identity of the first edge computing platform can be associated with an identity of the first edge computing platform.

In one embodiment, after the creating, by the first edge computing platform, an application program component instance of the first edge computing platform, the method further includes: registering, by the first edge computing platform, an application program component instance parameter and/or communications model of the first edge computing platform, where the application program component instance parameter includes one piece of the following information or any combination thereof: a name, a length, and a value range; and the application program component instance communications model includes one piece of the following information or any combination thereof: heartbeat information, application program signaling, media data, a data packet specification, whether a receive end needs to reply, response time validity, and priority information; and sending the application program component instance parameter and/or communications model of the first edge computing platform to the second edge computing platform. By using the solution provided in this embodiment, the application program component instance that runs on the first edge computing platform can communicate with an application program component instance that runs on the second edge computing platform by using the same parameter and/or communications model.

In one embodiment, after the sending, by the first edge computing platform, the application program component of the second edge computing platform to the second edge computing platform, the method further includes: receiving, by the first edge computing platform, first response information sent from the second edge computing platform, where the first response information includes an application program component instance parameter and/or communications model of the second edge computing platform. By using the solution provided in this embodiment, the application program component instance that runs on the first edge computing platform can further communicate with the application program component instance that runs on the second edge computing platform by using the same parameter and/or communications model.

In one embodiment, after the receiving, by the first edge computing platform, first response information sent from the second edge computing platform, the method further includes: performing, by the first edge computing platform, an adjustment on the application program component or resource scheduling on an access network based on the application program component instance parameters and/or communications models of the first edge computing platform and the second edge computing platform.

In one embodiment, after the sending, by the first edge computing platform, the application program component of the second edge computing platform to the second edge computing platform, the method further includes: receiving, by the first edge computing platform, second response information sent from the second edge computing platform, where the second response information includes a process instance identity ID and a process ID, an event trigger instance ID and an event trigger ID, an execution action instance ID and an execution action ID, an algorithm instance ID, and an algorithm ID that are in the application program component of the second edge computing platform.

In one embodiment, after the sending, by the first edge computing platform, the application program component of the second edge computing platform to the second edge computing platform, the method further includes: obtaining, by the first edge computing platform, an application program event report; and generating the application program component of the first edge computing platform and the application program component of the second edge computing platform based on the application program event report. By using the solution provided in this embodiment, the first edge computing platform is enabled to finish updating the application program component.

In one embodiment, after the sending, by the first edge computing platform, the application program component of the second edge computing platform to the second edge computing platform, the method further includes: obtaining, by the first edge computing platform, an application program event report; and generating an application program component module corresponding to an application program component instance identity of the first edge computing platform and an application program component module corresponding to an application program component instance identity of the second edge computing platform based on the application program event report, where the application program component module includes at least one of a process module, an event trigger module, an execution action module, and an algorithm module. By using the solution provided in this embodiment, the first edge computing platform is enabled to finish updating the application program component module corresponding to the application program component instance identity.

In one embodiment, the obtaining, by the first edge computing platform, an application program event report includes: obtaining, by the first edge computing platform, the application program event report sent from the second edge computing platform; or obtaining the application program event report generated by the first edge computing platform, where the application program event report is generated after an event trigger instance in the application program component instance of the first edge computing platform satisfies a first trigger condition. By using the solution provided in this embodiment, the application program event report can be obtained.

In one embodiment, the obtaining, by a first edge computing platform, an application program component of the first edge computing platform and an application program component of a second edge computing platform includes: obtaining, by the first edge computing platform, the application program component of the first edge computing platform and the application program component of the second edge computing platform that are sent from a previous-level first edge computing platform; or obtaining the application program component of the first edge computing platform and the application program component of the second edge computing platform that are generated by the first edge computing platform.

According to a second aspect, an embodiment of this application provides a method for managing an application program, including: obtaining, by a second edge computing platform, an application program component that is of the second edge computing platform and that is sent from a first edge computing platform, where the application program component of the second edge computing platform is an application program component in a global application program; and creating, by the second edge computing platform, an application program component instance of the second edge computing platform. By using the solution provided in this embodiment, the second edge computing platform is enabled to finish deploying application programs.

In one embodiment, before the obtaining, by a second edge computing platform, an application program component that is of the second edge computing platform and that is sent from a first edge computing platform, the method further includes: sending, by the second edge computing platform, registration information to the first edge computing platform, where the registration information includes one piece of the following information or any combination thereof: an identity of the second edge computing platform, a type of a device in which the second edge computing platform is located, a model of the device, a capability of the device, a function of the device, a communications module identity of the device, and location information of the device in a network.

In one embodiment, the second edge computing platform obtains the registration information from a software and hardware module of the device in which the second edge computing platform is located.

In one embodiment, after the creating, by the second edge computing platform, an application program component instance of the second edge computing platform, the method further includes: allocating, by the second edge computing platform, an identity to the application program component instance of the second edge computing platform, registering an application program component instance parameter and/or communications model of the second edge computing platform; and sending, by the second edge computing platform, a first response message to the first edge computing platform, where the first response message includes the application program component instance parameter and/or communications model of the second edge computing platform. By using the solution provided in this embodiment, an application program component instance that runs on the first edge computing platform can communicate with an application program component instance that runs on the second edge computing platform by using the same parameter and/or communications model.

In one embodiment, after the creating, by the second edge computing platform, an application program component instance of the second edge computing platform, the method further includes: sending, by the second edge computing platform, a second response message to the first edge computing platform, where the second response information includes at least one of a process instance ID, a process ID, an event trigger instance ID, an event trigger ID, an execution action instance ID, an execution action ID, an algorithm instance ID, an algorithm ID that are in the application program component of the second edge computing platform.

In one embodiment, the method further includes: sending, by the second edge computing platform, an application program event report to the first edge computing platform when an event trigger instance in the application program component instance satisfies a second trigger condition. By using the solution provided in this embodiment, the application program event report can be obtained.

According to a third aspect, an embodiment of this application provides a device for managing an application program, including a memory and a processor, where the memory is configured to store a program instruction; and the processor is configured to invoke the program instruction stored in the memory, to perform the following operations:

obtaining an application program component of a first edge computing platform and an application program component of a second edge computing platform, where the application program component of the first edge computing platform and the application program component of the second edge computing platform are application program components in a global application program; and sending the application program component of the second edge computing platform to the second edge computing platform.

In one embodiment, the processor is further configured to invoke the program instruction stored in the memory, to perform the following operation:

obtaining registration information sent from the second edge computing platform before the obtaining an application program component of a first edge computing platform and an application program component of a second edge computing platform, where the registration information includes one piece of the following information or any combination thereof: an identity of the second edge computing platform, a type of a device in which the second edge computing platform is located, a model of the device, a capability of the device, a function of the device, a communications module identity of the device, and location information of the device in a network.

In one embodiment, the processor is further configured to invoke the program instruction stored in the memory, to perform the following operations:

allocating an identity to an instance corresponding to the global application program; and sending an instance identity corresponding to the global application program to the second edge computing platform.

In one embodiment, the processor is further configured to invoke the program instruction stored in the memory, to perform the following operation:

creating an application program component instance of the first edge computing platform, and allocating an identity to the application program component instance of the first edge computing platform.

In one embodiment, the processor is further configured to invoke the program instruction stored in the memory, to perform the following operations:

registering an application program component instance parameter and/or communications model of the first edge computing platform after the creating an application program component instance of the first edge computing platform, where the application program component instance parameter includes one piece of the following information or any combination thereof: a name, a length, and a value range; and the application program component instance communications model includes one piece of the following information or any combination thereof: heartbeat information, application program signaling, media data, a data packet specification, whether a receive end needs to reply, response time validity, and priority information; and sending the application program component instance parameter and/or communications model of the first edge computing platform to the second edge computing platform.

In one embodiment, the processor is further configured to invoke the program instruction stored in the memory, to perform the following operation:

receiving first response information sent from the second edge computing platform after the sending the application program component of the second edge computing platform to the second edge computing platform, where the first response information includes an application program component instance parameter and/or communications model of the second edge computing platform.

In one embodiment, the processor is further configured to invoke the program instruction stored in the memory, to perform the following operation:

performing an adjustment on the application program component or resource scheduling on an access network based on the application program component instance parameters and/or communications models of the first edge computing platform and the second edge computing platform after the receiving first response information sent from the second edge computing platform.

In one embodiment, the processor is further configured to invoke the program instruction stored in the memory, to perform the following operation:

receiving second response information sent from the second edge computing platform after the sending the application program component of the second edge computing platform to the second edge computing platform, where the second response information includes at least one of a process instance identity ID, a process ID, an event trigger instance ID, an event trigger ID, an execution action instance ID, an execution action ID, an algorithm instance ID, and an algorithm ID that are in the application program component of the second edge computing platform.

In one embodiment, the processor is further configured to invoke the program instruction stored in the memory, to perform the following operations:

obtaining an application program event report after the sending the application program component of the second edge computing platform to the second edge computing platform; and generating the application program component of the first edge computing platform and the application program component of the second edge computing platform based on the application program event report.

In one embodiment, the processor is further configured to invoke the program instruction stored in the memory, to perform the following operations:

obtaining the application program event report after the sending the application program component of the second edge computing platform to the second edge computing platform; and generating an application program component module corresponding to an application program component instance identity of the first edge computing platform and an application program component module corresponding to an application program component instance identity of the second edge computing platform based on the application program event report, where the application program component module includes at least one of a process module, an event trigger module, an execution action module, and an algorithm module.

In one embodiment, the processor is further configured to invoke the program instruction stored in the memory, to perform the following operation:

obtaining the application program event report sent from the second edge computing platform; or obtaining the application program event report generated by the first edge computing platform, where the application program event report is generated after an event trigger instance in the application program component instance of the first edge computing platform satisfies a first trigger condition.

In one embodiment, the processor is further configured to invoke the program instruction stored in the memory, to perform the following operation:

obtaining the application program component of the first edge computing platform and the application program component of the second edge computing platform that are sent from a previous-level first edge computing platform; or obtaining the application program component of the first edge computing platform and the application program component of the second edge computing platform that are generated by the first edge computing platform.

According to a fourth aspect, an embodiment of this application provides a device for managing an application program, including a memory and a processor, where the memory is configured to store a program instruction; and the processor is configured to invoke the program instruction stored in the memory, to perform the following operation:

obtaining an application program component that is of a second edge computing platform and that is sent from a first edge computing platform, where the application program component of the second edge computing platform is an application program component in a global application program; and creating an application program component instance of the second edge computing platform.

In one embodiment, the processor is further configured to invoke the program instruction stored in the memory, to perform the following operation:

sending registration information to the first edge computing platform before the obtaining an application program component that is of a second edge computing platform and that is sent from a first edge computing platform, where the registration information includes one piece of the following information or any combination thereof: an identity of the second edge computing platform, a type of a device in which the second edge computing platform is located, a model of the device, a capability of the device, a function of the device, a communications module identity of the device, and location information of the device in a network.

In one embodiment, the processor is further configured to invoke the program instruction stored in the memory, to perform the following operation:

obtaining the registration information from a software and hardware module of the device in which the second edge computing platform is located.

In one embodiment, the processor is further configured to invoke the program instruction stored in the memory, to perform the following operations:

allocating an identity to the application program component instance of the second edge computing platform after the creating an application program component instance of the second edge computing platform;

registering an application program component instance parameter and/or communications model of the second edge computing platform; and sending a first response message to the first edge computing platform, where the first response message includes the application program component instance parameter and/or communications model of the second edge computing platform.

In one embodiment, the processor is further configured to invoke the program instruction stored in the memory, to perform the following operation:

sending a second response message to the first edge computing platform after the creating an application program component instance of the second edge computing platform, where the second response information includes a process instance identity ID and a process ID, an event trigger instance ID and an event trigger ID, an execution action instance ID and an execution action ID, an algorithm instance ID, and an algorithm ID that are in the application program component of the second edge computing platform.

In one embodiment, the processor is further configured to invoke the program instruction stored in the memory, to perform the following operation:

sending an application program event report to the first edge computing platform when an event trigger instance in the application program component instance satisfies a second trigger condition.

According to a fifth aspect, an embodiment of this application provides a device for managing an application program, including:

a processing unit, configured to obtain an application program component of a first edge computing platform and an application program component of a second edge computing platform, where the application program component of the first edge computing platform and the application program component of the second edge computing platform are application program components in a global application program; and a communications unit, configured to send the application program component that is of the second edge computing platform and that is obtained by the processing unit.

In one embodiment, before obtaining the application program component of the first edge computing platform and the application program component of the second edge computing platform, the processing unit is further configured to:

control the communications unit to obtain registration information sent from the second edge computing platform, where the registration information includes one piece of the following information or any combination thereof: an identity of the second edge computing platform, a type of a device in which the second edge computing platform is located, a model of the device, a capability of the device, a function of the device, a communications module identity of the device, and location information of the device in a network.

In one embodiment, the processing unit is further configured to:

allocate an identity to an instance corresponding to the global application program; and control the communications unit to send an instance identity corresponding to the global application program to the second edge computing platform.

In one embodiment, the processing unit is further configured to:

create an application program component instance of the first edge computing platform, and allocate an identity to the application program component instance of the first edge computing platform.

In one embodiment, after creating the application program component instance of the first edge computing platform, the processing unit is further configured to:

register an application program component instance parameter and/or communications model of the first edge computing platform, where the application program component instance parameter includes one piece of the following information or any combination thereof: a name, a length, and a value range; and the application program component instance communications model includes one piece of the following information or any combination thereof: heartbeat information, application program signaling, media data, a data packet specification, whether a receive end needs to reply, response time validity, and priority information; and control the communications unit to send the application program component instance parameter and/or communications model of the first edge computing platform to the second edge computing platform.

In one embodiment, after sending the application program component of the second edge computing platform to the second edge computing platform, the processing unit is further configured to:

control the communications unit to receive first response information sent from the second edge computing platform, where the first response information includes an application program component instance parameter and/or communications model of the second edge computing platform.

In one embodiment, after receiving the first response information sent from the second edge computing platform, the processing unit is further configured to:

perform an adjustment on the application program component or resource scheduling on an access network based on the application program component instance parameters and/or communications models of the first edge computing platform and the second edge computing platform.

In one embodiment, after sending the application program component of the second edge computing platform to the second edge computing platform, the processing unit is further configured to:

control the communications unit to receive second response information sent from the second edge computing platform, where the second response information includes at least one of a process instance ID, a process ID, an event trigger instance ID, an event trigger ID, an execution action instance ID, an execution action ID, an algorithm instance ID, and an algorithm ID that are in the application program component of the second edge computing platform.

In one embodiment, after sending the application program component of the second edge computing platform to the second edge computing platform, the processing unit is further configured to:

obtain an application program event report; and generate the application program component of the first edge computing platform and the application program component of the second edge computing platform based on the application program event report.

In one embodiment, after the first edge computing platform sends the application program component of the second edge computing platform to the second edge computing platform, the processing unit is further configured to:

obtain the application program event report; and generate an application program component module corresponding to an application program component instance identity of the first edge computing platform and an application program component module corresponding to an application program component instance identity of the second edge computing platform based on the application program event report, where the application program component module includes at least one of a process module, an event trigger module, an execution action module, and an algorithm module.

In one embodiment, when obtaining the application program event report, the processing unit is configured to:

obtain the application program event report sent from the second edge computing platform; or obtain the application program event report generated by the first edge computing platform, where the application program event report is generated after an event trigger instance in the application program component instance of the first edge computing platform satisfies a first trigger condition.

In one embodiment, when obtaining the application program component of the first edge computing platform and the application program component of the second edge computing platform, the processing unit is configured to:

obtain the application program component of the first edge computing platform and the application program component of the second edge computing platform that are sent from a previous-level first edge computing platform; or obtain the application program component of the first edge computing platform and the application program component of the second edge computing platform that are generated by the first edge computing platform.

According to a sixth aspect, an embodiment of this application provides a device for managing an application program, including:

a communications unit, configured to obtain an application program component that is of a second edge computing platform and that is sent from a first edge computing platform, where the application program component of the second edge computing platform is an application program component of a global application program; and a processing unit, configured to create an application program component instance of the second edge computing platform.

In one embodiment, before obtaining the application program component that is of the second edge computing platform and that is sent from the first edge computing platform, the processing unit is further configured to:

control the communications unit to send registration information to the first edge computing platform, where the registration information includes one piece of the following information or any combination thereof: an identity of the second edge computing platform, a type of a device in which the second edge computing platform is located, a model of the device, a capability of the device, a function of the device, a communications module identity of the device, and location information of the device in a network.

In one embodiment, the processing unit is further configured to:

obtain the registration information from a software and hardware module of the device in which the second edge computing platform is located.

In one embodiment, after creating the application program component instance of the second edge computing platform, the processing unit is further configured to:

allocate an identity to the application program component instance of the second edge computing platform;

register an application program component instance parameter and/or communications model of the second edge computing platform; and control the communications unit to send a first response message to the first edge computing platform, where the first response message includes the application program component instance parameter and/or communications model of the second edge computing platform.

In one embodiment, after creating the application program component instance of the second edge computing platform, the processing unit is further configured to:

control the communications unit to send a second response message to the first edge computing platform, where the second response information includes at least one of a process instance ID, a process ID, an event trigger instance ID, an event trigger ID, an execution action instance ID, an execution action ID, an algorithm instance ID, and an algorithm ID that are in the application program component of the second edge computing platform.

In one embodiment, the processing unit is further configured to:

control the communications unit to send an application program event report to the first edge computing platform when an event trigger instance in the application program component instance satisfies a second trigger condition.

According to a seventh aspect, an embodiment of this application provides a device for managing an application program, including: a communications interface, a processor, and a memory, where the memory is configured to store a software program; the processor is configured to read the software program stored in the memory; and the communications interface is configured to receive and send data. The device may implement the method according to any design of the first aspect.

According to an eighth aspect, an embodiment of this application provides a device for managing an application program, including: a communications interface, a processor, and a memory, where the memory is configured to store a software program; the processor is configured to read the software program stored in the memory; and the communications interface is configured to receive and send data. The device may implement the method according to any design of the second aspect.

According to a ninth aspect, an embodiment of this application provides a computer-readable storage medium, including a computer-readable instruction, where when a computer reads and executes the computer-readable instruction, the computer performs the method according to any design of the first aspect.

According to a tenth aspect, an embodiment of this application provides a computer-readable storage medium, including a computer-readable instruction, where when a computer reads and executes the computer-readable instruction, the computer performs the method according to any design of the second aspect.

According to an eleventh aspect, an embodiment of this application provides a computer program product, including a computer-readable instruction, where when a computer reads and executes the computer-readable instruction, the computer performs the method according to any design of the first aspect.

According to a twelfth aspect, an embodiment of this application provides a computer program product, including a computer-readable instruction, where when a computer reads and executes the computer-readable instruction, the computer performs the method according to any design of the second aspect.

DESCRIPTION OF EMBODIMENTS

To make the objectives, technical solutions, and advantages of this application clearer, the following further describes this application in detail with reference to the accompanying drawings.

Figure 1A:
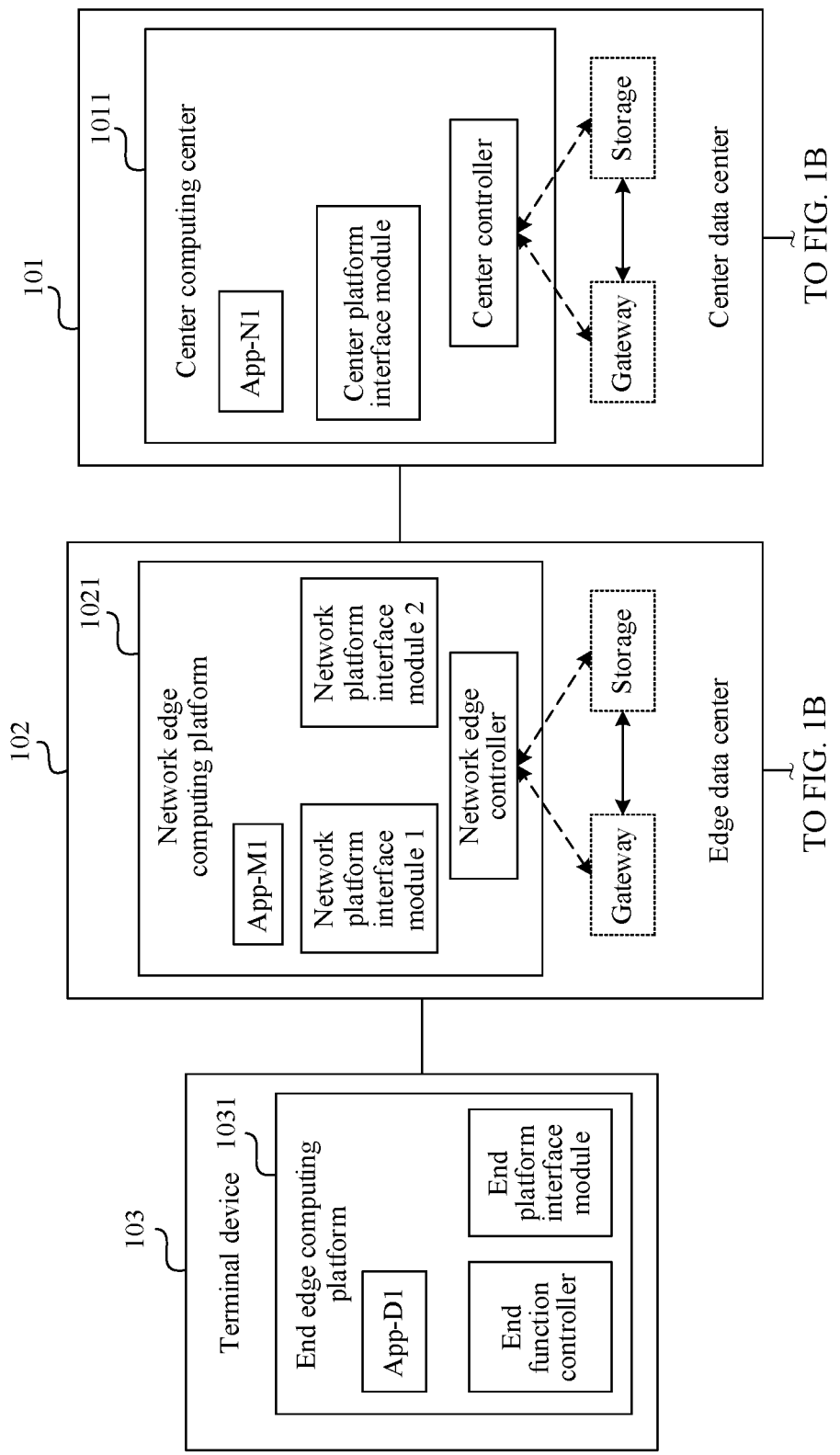
FIG. 1A and FIG. 1B are a schematic structural diagram of a communications system according to an embodiment of this application.
Figure 1B:
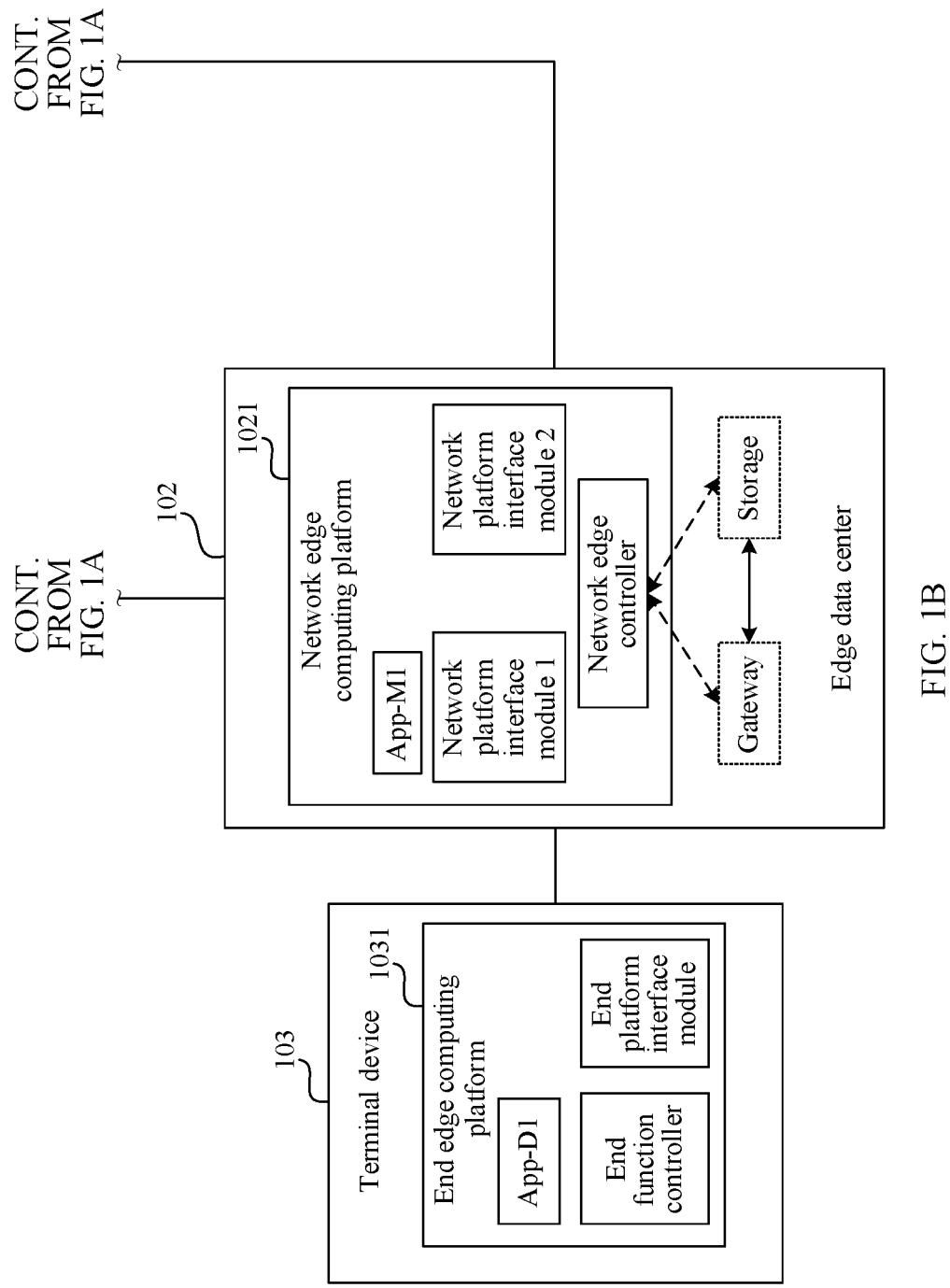

Embodiments of this application provide a method for managing an application program. The method may be applied to a communications system shown in FIG. 1A and FIG. 1B. As shown in FIG. 1A and FIG. 1B, the communications system includes a center data center 101, at least one edge data center 102, and at least one terminal device 103, where the center data center 101 may be located on the core network side, and a center computing platform 1011 is deployed in the center data center 101; the edge data center 102 may be located on the access network side, and at least one network edge computing platform 1021 is deployed in the edge data center 102; and at least one end edge computing platform 1031 is deployed in the terminal device 103.

The center computing platform 1011 may be located in a device on the core network side of a communications network, for example, a mobile management entity (MME) and a gateway that are in long term evolution (LTE) network, or may be a control plane (CP) network function (NF) and a user plane (UP) network function that are in a 5G network, for example, a common control plane network function (CCNF), a session management network function (SMF), and the like. The center computing platform 1011 includes a center platform interface module, and a center controller. In embodiments of this application, the center platform interface module and the center controller may be logical units, or may be physical units. This is not limited herein. An application program APP-N1 may be deployed on the center computing platform 1011.

In one embodiment, the center data center 101 may further include a gateway or a storage device. The gateway may be a gateway GPRS support node (GGSN) in a 3G network, a public data network gateway (PDN-GW) or a serving gateway (S-GW) in a 4G network, a user plane function (UPF) in the 5G network, a router or a broadband network gateway (BNG) in a wired network, or the like. The storage device may be a hard disk or a short-term or long-term storage facility such as a cache that uses a random access memory (RAM) or read-only memory (ROM) technology. The center computing platform 1011 controls the gateway or the storage device through the center controller. The center computing platform 1011 communicates with a next-level platform through the center platform interface module, and the next-level platform may be, for example, a network edge computing platform or an end edge computing platform.

The network edge computing platform 1021 may be located in a device on the access network side of the communications network, for example, an evolved node B (eNodeB), a wireless fidelity access point (WiFi AP), a worldwide interoperability for microwave access base station (WiMAX BS), or a radio controller in a cloud radio access network (CRAN). The network device may alternatively be an access network device in a 5G network or an access network device in a future evolved PLMN.

The network edge computing platform 1021 includes a network platform interface module 1, a network platform interface module 2, and a network edge controller. The network platform interface module 1 may be disposed in combination with the network platform interface module 2. In embodiments of this application, the network platform interface module 1, the network platform interface module 2, and the network edge controller may be logical units, or may be physical units. This is not limited herein. In one embodiment, the edge data center 102 may further include a gateway or a storage device. The network edge computing platform 1021 controls the gateway or the storage device through the network edge controller. The network edge computing platform communicates with the end edge computing platform through the network platform interface module 1. The network edge computing platform 1021 communicates with the center computing platform or other network edge computing platforms through the network platform interface module 2. The network edge computing platform 1021 may alternatively communicate with an access network device that is in the communications network through the network edge controller. An application program APP-M1 may be deployed on the network edge computing platform 1021.

The end edge computing platform 1031 may be located in the terminal device 103, for example, a vertical industry terminal device such as a video monitor terminal device or an AR/VR terminal device, or loading devices of vehicles, shipping, or unmanned aircraft. The end edge computing platform may be located in user equipment (UE), a subscriber unit, a subscriber station, a mobile station, a mobile console, a remote station, a remote terminal device, a mobile terminal device, a user terminal device, a terminal device, a wireless communications device, a user agent, a user apparatus, a cellular phone, a cordless phone, a session initiation protocol (SIP) phone, a wireless local loop (WLL) station, a personal digital assistant (PDA), a handheld device having a wireless communication function, a computing device, a processing device connected to a wireless modem, an in-vehicle device, a wearable device, a home gateway, a terminal device in an Internet of Things, a household appliance, a virtual reality device, a terminal device in the 5G network, or a terminal device in the future evolved public land mobile network (PLMN).

The end edge computing platform 1031 includes an end function controller and an end platform interface module. In embodiments of this application, the end function controller and the end platform interface module may be logical units, or may be physical units. This is not limited herein. The end edge computing platform 1031 controls, through the end function controller, a software module and a hardware module that are of the terminal device in which the end edge computing platform 1031 is located. The end edge computing platform 1031 communicates with a previous-level platform through the end platform interface module, for example, the previous-level platform may be a network edge computing platform. An application program APP-D1 may be deployed on the end edge computing platform 1031. The application program APP-D1, APP-M1, and APP-N1 form a global application program. Correspondingly, APP-D1, APP-M1, and APP-N1 are components of the global application program.

Figure 2A:
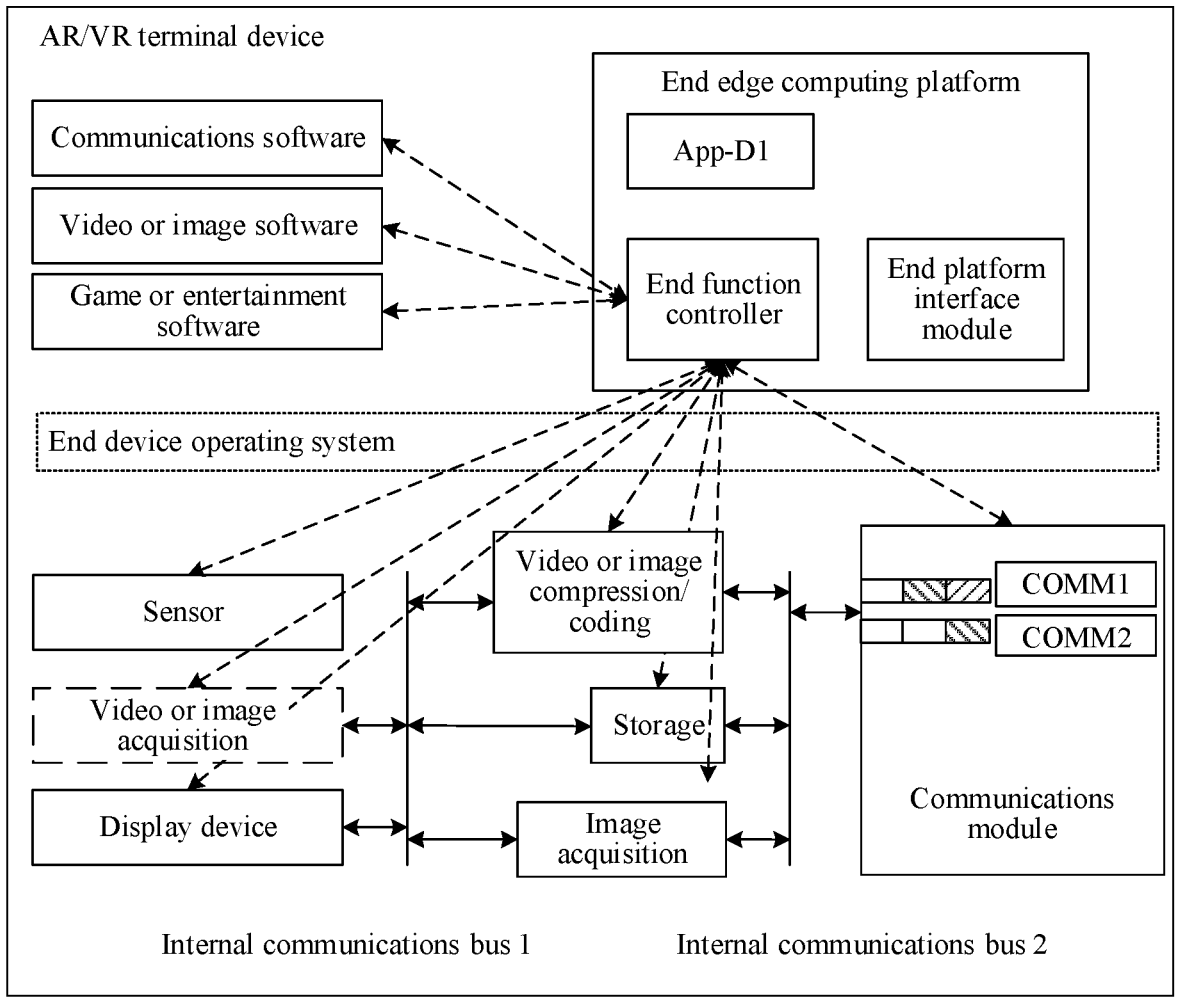
FIG. 2a to FIG. 2c are respectively schematic structural diagrams of a terminal device according to an embodiment of this application.

As shown in FIG. 2a, when the terminal device in which the end edge computing platform 1031 is located is an AR/VR terminal device, the end edge computing platform 1031 controls software such as communications software, video or image software, game or entertainment software, or the like through an end function controller; the end edge computing platform 1031 may further control, through the end function controller, devices such as a sensor, a video or image acquisition module or device, a display device, a video or image compression coding module, a storage device, an image processing module or device, a wired, wireless communications module or device, and the like to execute corresponding instructions. The sensor may be an inertial sensor, an action-capturing sensor, a proximity sensor, an induction sensor, or the like; the video or image acquisition module or device may be a complementary metal oxide semiconductor (CMOS), a charge-coupled device (CCD), an infrared image sensor, a camera, or the like; the display device may be a liquid crystal panel, or an indicator light; the video or image compression coding module may be a hardware compression coding chip, compression coding software that runs in a processor, or the like; the storage device may be a storage chip, a hard disk and a controller of the hard disk, or the like; the image processing module or device may be a hardware image algorithm processing chip, or image algorithm processing software that runs in a dedicated digital signal processor or image processor; and the communications module or device may be 2G/3G/4G/5G wireless, wireless local area network (WLAN), microwave, optical communication, or copper medium wired communication chips that are independent or integrated in other systems, or the like. In FIG. 2a, a dashed line shows a control channel, and a solid line shows a data channel.

In one embodiment, the AR/VR terminal device further includes an end device operating system, the end device operating system may alternatively be located in the end edge computing platform 1031, or the end edge computing platform 1031 is located in the end device operating system.

The sensor, the video or image acquisition module or device, and the display device that are in the AR/VR terminal device can communicate with the video or image compression coding module, the storage device, and the image processing module or device through an internal communications bus 1, the video or image compression coding module, the storage device, and the image processing module or device can communicate with the communications module or device through an internal communications bus 2.

Figure 2B:
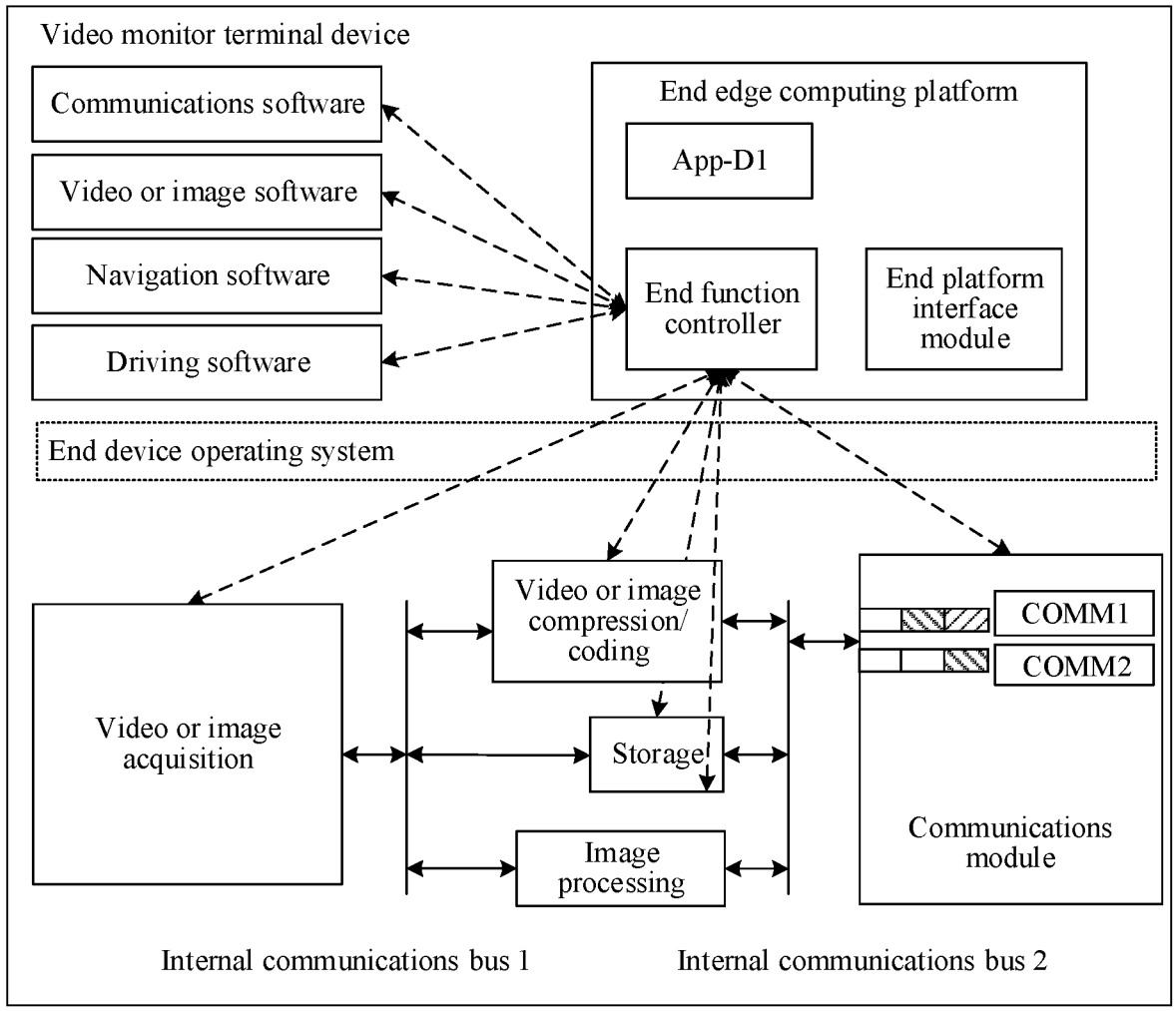

As shown in FIG. 2b, when the terminal device in which the end edge computing platform 1031 is located is a video monitor terminal device, the end edge computing platform 1031 controls software such as communications software, video or image software, navigation software, driving software, or the like through an end function controller; the end edge computing platform 1031 may further control, through the end function controller, devices such as a video or image acquisition module or device, a video or image compression coding module, a storage device, an image processing module or device, a communications module or device, and the like to execute corresponding instructions. In FIG. 2b, a dashed line shows a control channel, and a solid line shows a data channel.

In one embodiment, the video monitor terminal device further includes an end device operating system, the end device operating system may alternatively be located in the end edge computing platform 1031, or the end edge computing platform 1031 is located in the end device operating system. The video or image acquisition module or device in the video monitor terminal device can communicate with the video or image compression coding module, the storage device, and the image processing module or device through an internal communications bus 1, the video or image compression coding module, the storage device, and the image processing module or device can communicate with the communications module or device through an internal communications bus 2.

Figure 2C:
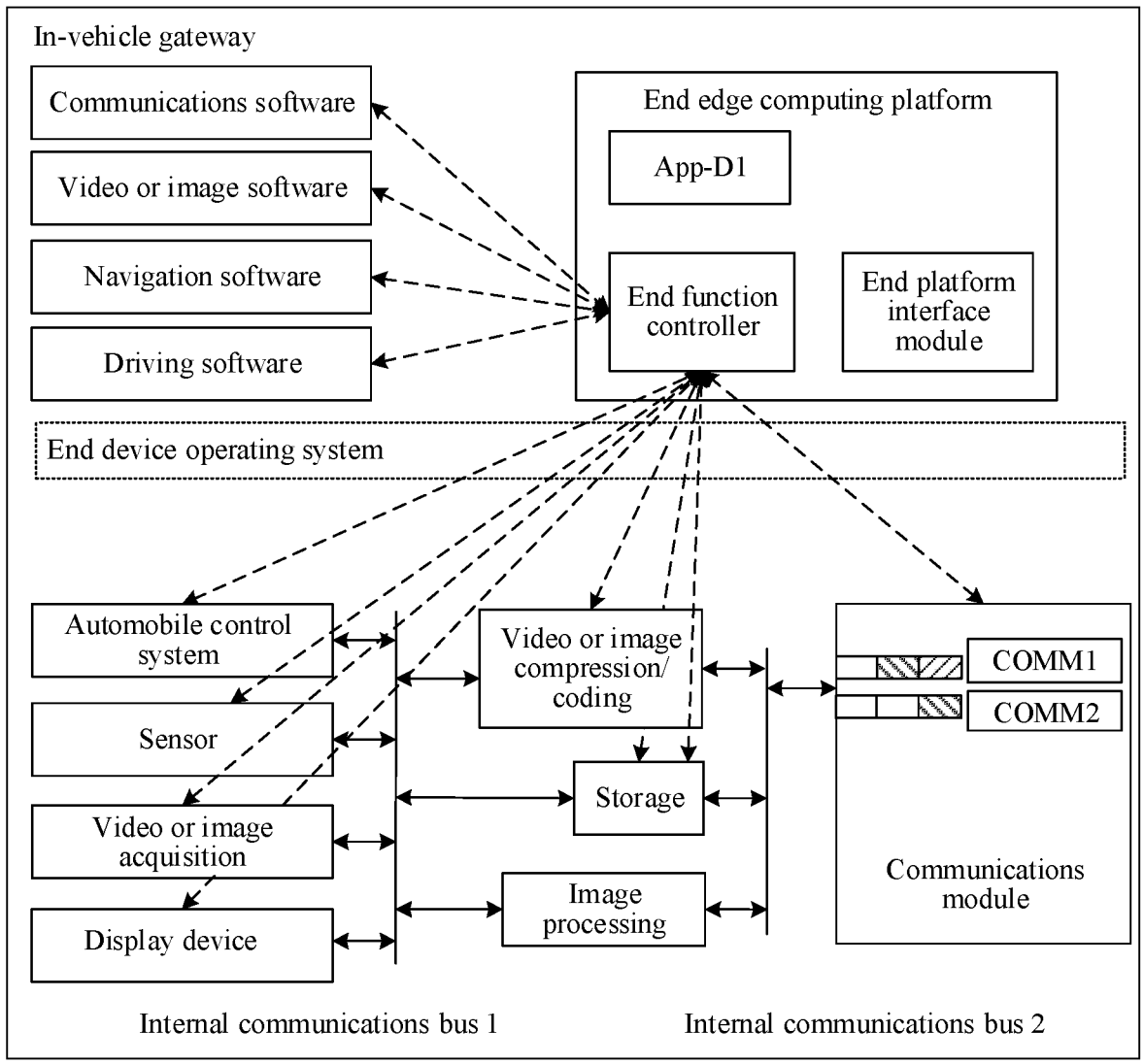

As shown in FIG. 2c, when the terminal device in which the end edge computing platform 1031 is located is an in-vehicle gateway, the end edge computing platform 1031 controls software such as communications software, video or image software, navigation software, driving software, or the like through an end function controller; the end edge computing platform 1031 may further control, through the end function controller, devices such as an automobile control system, a sensor, a video or image acquisition module or device, a display device, a video or image compression coding module, a storage device, an image processing module or device, a communications module or device, and the like to execute corresponding instructions. In FIG. 2c, a dashed line shows a control channel, and a solid line shows a data channel.

In one embodiment, the in-vehicle gateway further includes an end device operating system, the end device operating system may alternatively be located in the end edge computing platform 1031, or the end edge computing platform 1031 is located in the end device operating system. The automobile control system, the sensor, the video or image acquisition module or device, and the display device that are in the in-vehicle gateway can communicate with the video or image compression coding module, the storage device, and the image processing module or device through an internal communications bus 1, and the video or image compression coding module, the storage device, and the image processing module or device can communicate with the communications module or device through an internal communications bus 2.

In this application, the network edge computing platform 1021 and the center computing platform 1011 may further include an application programming interface (API) oriented to a third-party developer. By using interface modules between network edge computing platforms 1021, between the network edge computing platform 1021 and the end edge computing platform 1031, and between the network edge computing platform 1021 and the center computing platform 1011, application program components of a global application program of a particular service may be sent to a related end edge computing platform 1031, network edge computing platform 1021, and center computing platform 1011 for deployment. With cooperation of application program components deployed on platforms, a service requirement of developers and users can be satisfied.

The foregoing FIG. 1A and FIG. 1B merely shows a communications system of a three-level platform architecture, and the communications system may alternatively be a two-level platform architecture. The two-level platform architecture may be a combination of a network edge computing platform and an end edge computing platform, or may be a combination of a center computing platform and an end edge computing platform, and a communications manner of the two-level platform architecture is similar to that of the foregoing three-level platform architecture. Details are not described again.

It should be noted that in this application, a term "a plurality of" refers to two or more than two. In view of this, in this application, the "a plurality of" may also be understood as "at least two". The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects.

A method for managing an application program according to this application is described below with reference to FIG. 1A and FIG. 1B, FIG. 2a, FIG. 2b, FIG. 2c, and FIG. 3.

Figure 3:
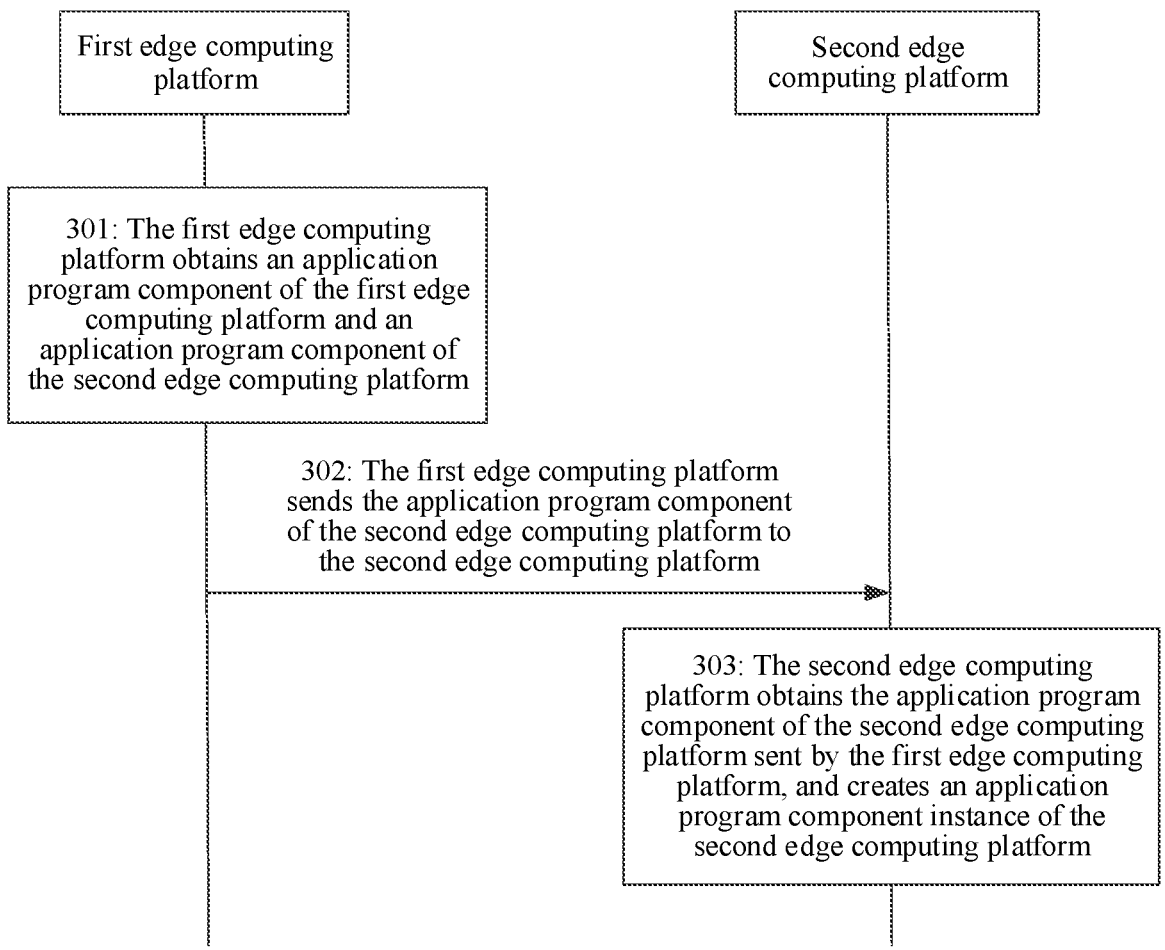
FIG. 3 is a schematic flowchart of a method for managing an application program according to an embodiment of this application.

FIG. 3 is a flowchart of a method for managing an application program according to this application, and the method includes the following operations.

Operation 301: A first edge computing platform obtains an application program component of the first edge computing platform and an application program component of a second edge computing platform.

In this application, the first edge computing platform may be a network edge computing platform in the foregoing FIG. 1A and FIG. 1B, or may be a center computing platform. The second edge computing platform may be an end edge computing platform in the foregoing FIG. 1A and FIG. 1B.

When a communications system is a two-level platform, that the first edge computing platform obtains the application program component of the first edge computing platform and the application program component of the second edge computing platform is specifically: obtaining, by the network edge computing platform or the center computing platform, the application program component of the first edge computing platform and the application program component of the second edge computing platform that are generated locally. Certainly, the network edge computing platform or the center computing platform may alternatively obtain, through an API, the application program component of the first edge computing platform and the application program component of the second edge computing platform that are deployed by users.

When the communications system is a three-level platform, that the first edge computing platform obtains the application program component of the first edge computing platform and the application program component of the second edge computing platform is specifically: obtaining, by the network edge computing platform, the application program component of the first edge computing platform and the application program component of the second edge computing platform that are sent from the center computing platform. The application program component of the first edge computing platform and the application program component of the second edge computing platform that are sent from the center computing platform may be generated by the center computing platform, or may be obtained by the center computing platform from the users through the API.

The application program component of the first edge computing platform and the application program component of the second edge computing platform are application program components in a global application program. When the communications system is the three-level platform, the global application program may include an application program component on the center computing platform, one or more application program components on the network edge computing platform, and one or more application program components on an end edge computing platform. The center computing platform is a previous-level platform of the network edge computing platform, the network edge computing platform is a previous-level platform of the end edge computing platform, the network edge computing platform is a next-level platform of the center computing platform, and the end edge computing platform is a next-level platform of the network edge computing platform. When the communications system is the two-level platform, the global application program may include the application program component on the center computing platform and the one or more application program components on the end edge computing platform. The center computing platform or the network edge computing platform is a previous-level platform of the end edge computing platform, and the end edge computing platform is a next-level platform of the center computing platform or the network edge computing platform. In one embodiment, the global application program may further include the application program components on the network edge computing platform and the one or more application program components on the end edge computing platform. In this case, the network edge computing platform needs to provide the API and middleware oriented to developers and users to develop and install, deploy, and maintain application program components of platforms.

After the foregoing first edge computing platform sends the application program component of the second edge computing platform to the second edge computing platform, the first edge computing platform also needs to allocate an identity to an instance corresponding to the global application program, and then sends the instance identity corresponding to the global application program to the second edge computing platform. The first edge computing platform also needs to create an application program component instance of the first edge computing platform, and allocates an identity to the application program component instance of the first edge computing platform. The first edge computing platform may perform an association on some or all of a program identity, a program component identity, an instance identity, and a platform identity, for example, associating a global application program identity, an application program component identity of the first edge computing platform, and an application program component identity of the second edge computing platform with each other; associating the global application program identity, the application program component identity of the first edge computing platform, and an identity of the first edge computing platform with each other; associating the application program component identity of the second edge computing platform with an identity of the second edge computing platform; associating an global application program instance identity with the global application program identity; and associating an application program component instance identity of the first edge computing platform with the global application program instance identity.

The first edge computing platform also needs to register an application program component instance parameter and/or communications model of the first edge computing platform, so that the application program component instance that runs on the first edge computing platform can communicate with the application program component instance that runs on the second edge computing platform by using a same parameter and/or communications model. When the first edge computing platform is a center computing platform, the application program component instance parameter and/or communications model of the first edge computing platform is registered on a center platform interface module shown in the foregoing FIG. 1A and FIG. 1B; and when the first edge computing platform is a network edge computing platform, the application program component instance parameter and/or communications model of the first edge computing platform is registered on a network platform interface module 1 shown in the foregoing FIG. 1A and FIG. 1B. The first edge computing platform sends the application program component instance parameter and/or communications model of the first edge computing platform to the second edge computing platform. The application program component instance parameter includes one piece or a combination of a plurality of pieces of information such as a name, a length and a value range, and the like, for example, a name of a process parameter, a length of the name, and the value range. The communications model includes but is not limited to one piece or a combination of a plurality of pieces of information such as: a heartbeat message, application program signaling, media data, a data packet specification, whether a receive end needs to reply, response time validity, priority, and the like, for example, heartbeat information between the first edge computing platform and the second edge computing platform.

Operation 302: The first edge computing platform sends the application program component of the second edge computing platform to the second edge computing platform.

Operation 303: The second edge computing platform obtains the application program component of the second edge computing platform sent from the first edge computing platform, and creates the application program component instance of the second edge computing platform.

The second edge computing platform may allocate an identity to the application program component instance of the second edge computing platform. The second edge computing platform may perform an association on some or all of the program identity, the program component identity, the instance identity, and the platform identity, for example, associating an application program component instance identity of the second edge computing platform with one or more of the global application program identity, the global application program instance identity, the application program component identity of the first edge computing platform, and the application program component instance identity of the first edge computing platform.

The second edge computing platform also needs to register an application program component instance parameter and/or communications model of the second edge computing platform, so that the application program component instance that runs on the second edge computing platform can communicate with the application program component instance that runs on the first edge computing platform by using the same parameter and/or communications model. The application program component instance parameter and/or communications model of the second edge computing platform may be registered on an end platform interface module of the end edge computing platform shown in the foregoing FIG. 1A and FIG. 1B. The application program component instance parameter includes one piece of the following information or any combination thereof: the name, the length, and the value range, for example, a name of a process parameter. The application program component instance communications model includes one piece of the following information or any combination thereof: the heartbeat information, the application program signaling, the media data, the data packet specification, whether the receive end needs to reply, the response time validity, and priority information, for example, the heartbeat information between the first edge computing platform and the second edge computing platform.

After the second edge computing platform registers the application program component instance parameter and/or communications model of the second edge computing platform, the second edge computing platform sends first response information and second response information to the first edge computing platform, where the first response information may include the application program component instance parameter and/or communications model of the second edge computing platform, and the second response information may include a process instance identity and a process ID, an event trigger instance ID and an event trigger ID, an execution action instance ID and an execution action ID, an algorithm instance ID, and an algorithm ID that are in the application program component of the second edge computing platform. The process instance ID, the event trigger instance ID, the execution action instance ID, and the algorithm instance ID identify a location of this type of module that runs in the application program component instance. The process ID, the event trigger ID, the execution action ID, and the algorithm ID identify a logical function of this type of module.

After obtaining the first response message sent from the second edge computing platform, the first edge computing platform learns of the application program component instance parameter and/or communications model of the second edge computing platform, that is, the first edge computing platform can communicate with the end platform interface module of the second edge computing platform through the center platform interface module or the network platform interface module 1.

After obtaining the foregoing response information, the first edge computing platform creates, based on the application program component and the instance that are of the first edge computing platform and the application program component and the instance that are of the second edge computing platform, topology diagrams deployed by the application program component and the instance that are of the first edge computing platform and the application program component and the instance that are of the second edge computing platform on the first edge computing platform and the second edge computing platform. The first edge computing platform may perform an adjustment on the application program component or resource scheduling on an access network based on the application program component instance parameters and/or communications models of the first edge computing platform and the second edge computing platform. The adjustment on the application program component may be: updating the application program component.

When several application program component instances run on the first edge computing platform and the second edge computing platform, on one hand, service data proposes a requirement on transmission of an access network device (a wireless base station, a wired access network, or a WLAN device). The first edge computing platform comprehensively schedules network transmission resources based on different requirements of services on quality of service (QoS) such as transmission bandwidth, real-time performance and the like, to improve transmission efficiency. On the other hand, the first edge computing platform may enable, by changing service logic (an update process, an event trigger, an execution action, or an algorithm module) in the application program (component) instance based on the capability of the network transmission resources, processing on a service requirement that is performed by an application program deployed on a multi-level platform and a requirement of the application program on network transmission to be more efficiently distributed and adjusted dynamically in time and space, so that the network capacity is effectively used and exploited.

To enable the first edge computing platform and the second edge computing platform to deploy application program components, the second edge computing platform also needs to register with the first edge computing platform before the foregoing first edge computing platform obtains the application program component of the first edge computing platform and the application program component of the second edge computing platform, and this is specifically: sending, by the second edge computing platform, registration information of the second edge computing platform to the first edge computing platform, obtaining, by the first edge computing platform, the registration information of the second edge computing platform, and recording, by the first edge computing platform, the registration information of the second edge computing platform and updating the topology diagram of the managed second edge computing platform based on the registration information of the second edge computing platform. The foregoing registration information includes one piece of the following information or any combination thereof: an identity of the second edge computing platform, a device type, a device model, a device capability, a device function, a communications module identity, and location information in a network. The device type, the device model, the device capability, the device function, the communications module identity, and the location information in the network are obtained by the second edge computing platform from a software and hardware module in a terminal through a software and hardware module interface in the terminal. The device involved in the device type, the device model, the device capability, and the device function may be various types of terminal devices shown in the foregoing FIG. 1A and FIG. 1B, and FIG. 2a to FIG. 2c. The communications module identity may be communications module identities in various types of terminal devices shown in the foregoing FIG. 1A and FIG. 1B, and FIG. 2a to FIG. 2c.

Figure 4:
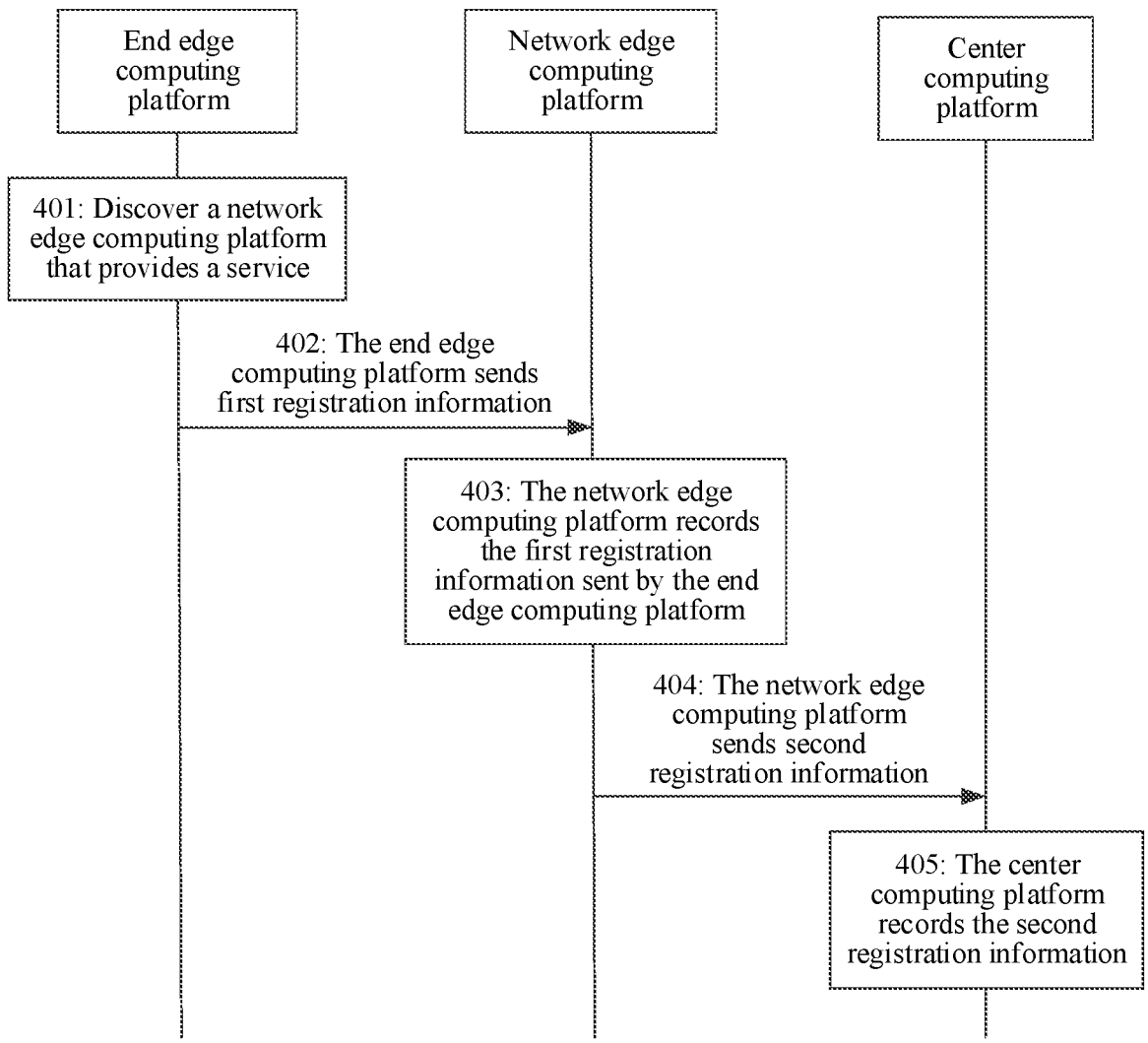
FIG. 4 is a schematic flowchart of platform registration according to an embodiment of this application.

For example, FIG. 4 shows a registration process: An end edge computing platform in a terminal device reports an identity of its own, a device type of the terminal device, a device model, and a device function to a network edge computing platform, and at the same time, may further report a communications module identity and location information in a network to the network edge computing platform. The network edge computing platform may further report to a center computing platform. The network edge computing platform and the center computing platform may update service topology based on the information. An exemplary registration process includes the following operations.

Operation 401: Discover a network edge computing platform that provides a service.

Corresponding to different scenarios, there are also a plurality of methods for discovering the network edge computing platform that provides the service: (1) After the end edge computing platform starts up, a domain name of the network edge computing platform that can provide a service for the end edge computing platform is queried through a domain name system (DNS), so that the network edge computing platform that provides the service is obtained. (2) The end edge computing platform may be connected to a default network edge computing platform, and by reporting a location of the end edge computing platform, the network edge computing platform that can provide the service is allocated by the default network edge computing platform for the end edge computing platform. (3) The end edge computing platform may obtain, through pre-configuration, the network edge computing platform that can provide the service. (4) When the end edge computing platform moves, movement information is sent to the network edge computing platform that is providing the service for the end edge computing platform, the network edge computing platform may select, for the end edge computing platform based on a new location (a cell and a tracking area that are obtained by a communications module, or latitude and longitude/height information obtained by a global positioning system (GPS) module) at which the end edge computing platform is located, a new network edge computing platform that provides the service, and send the new network edge computing platform that provides the service to the end edge computing platform.

Operation 402: The end edge computing platform sends first registration information to the network edge computing platform.

The first registration information carries information such as an identity of the end edge computing platform, the device type, the device model, the device function, and the like, or may carry the communications module identity and the location information in the network. The device involved in the device type, the device model, the device capability, and the device function may be various types of terminal devices shown in the foregoing FIG. 1A and FIG. 1B, and FIG. 2a to FIG. 2c. For example, the device type may be: a monitoring device, an AR device, a VR device, an in-vehicle gateway, and the like. The device capability is a software and hardware capability of the terminal device, for example, a sensor, a display device, a storage device, a communications device, a graphics processing unit, an algorithm accelerator, and the like. The communications module identity may be communications module identities in various types of terminal devices shown in the foregoing FIG. 1A and FIG. 1B, and FIG. 2a to FIG. 2c.

Operation 403: The network edge computing platform records the first registration information sent from the end edge computing platform.

The network edge computing platform records registration information of the end edge computing platform, and updates, based on the registration information of the end edge computing platform, the topology diagram of the terminal device managed by the platform.

Operation 404: The network edge computing platform sends second registration information to the center computing platform.

The second registration information carries information included in the foregoing first registration information. The network edge computing platform may further carry the identity of the network edge computing platform in the second registration message. The identity represents a location of the network edge computing platform or a topological relationship between the network edge computing platform and other network edge computing platforms, or center computing platforms.

Operation 405: The center computing platform records the second registration information.

The center computing platform records the registration information of the end edge computing platform and the identity of the network edge computing platform connected to the end edge computing platform, updates registered end edge computing platform information and the network edge computing platform connected to the end edge computing platform, and updates the topology diagram of the terminal device managed by the center computing platform.

It should be noted that the foregoing describes a registration process of a three-level platform. The center computing platform in operations 404 and 405 may further be a network edge computing platform. When a two-level platform is formed by an end edge computing platform and a network edge computing platform, operation 404 and operation 405 are not performed; and when the two-level platform is formed by an end edge computing platform and a center computing platform, (1) the end edge computing platform registers with the center computing platform, and (2) the center computing platform records the registration information of the end edge computing platform, and updates the topology diagram of the terminal device managed by the platform. Other embodiments in this application also have a similar situation, and are processed based on a same principle. Details are not described herein.

To better explain the foregoing process of managing an application program, the following provides descriptions by using an implementation scenario.

This embodiment uses a three-level platform as an example, and the center computing platform, the network edge computing platform, and the end edge computing platform that are shown in FIG. 1A and FIG. 1B are included.

Figure 5:
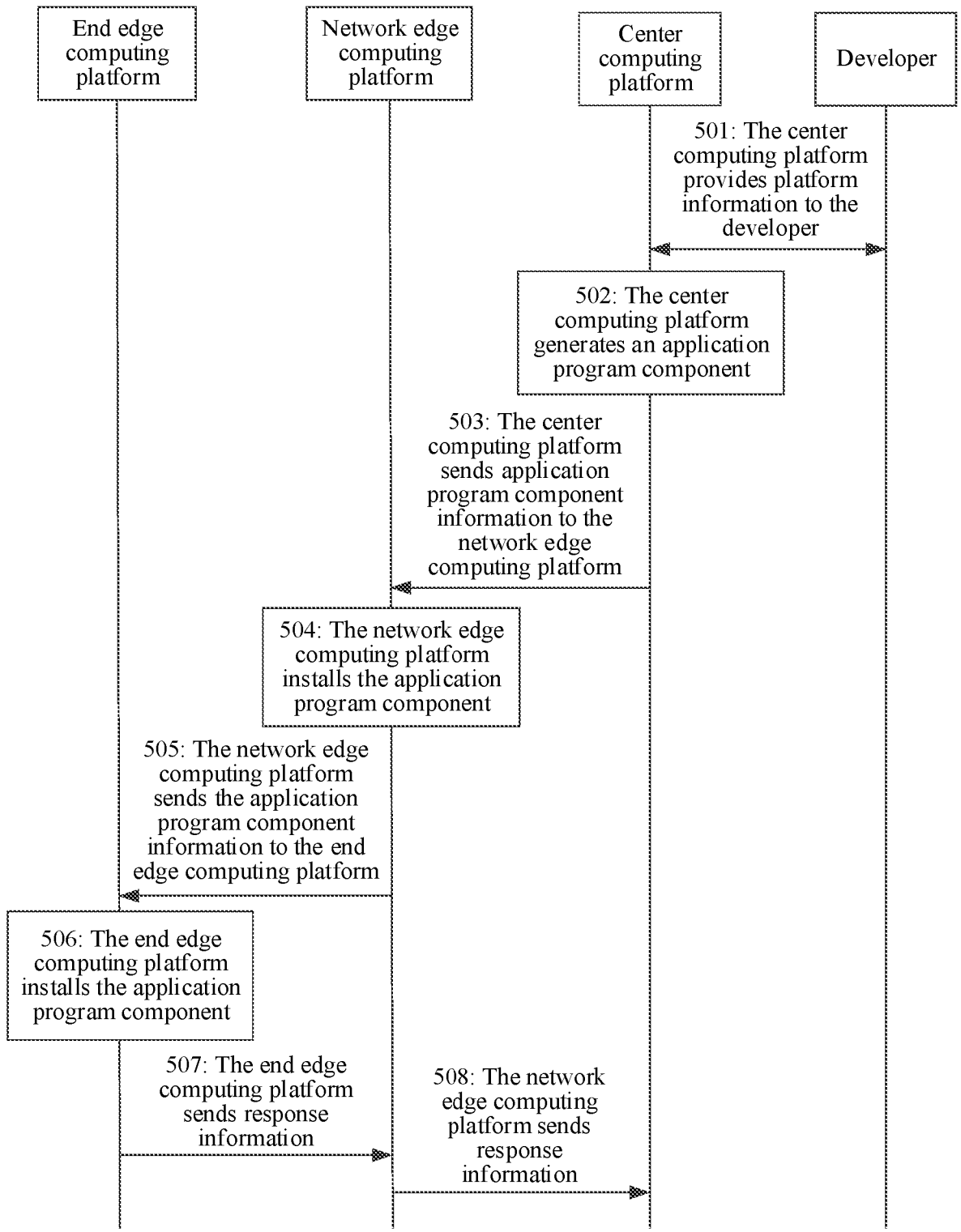
FIG. 5 is a schematic flowchart of a method for managing an application program according to an embodiment of this application.

The process shown in FIG. 5 includes the following operations.

Operation 501: A center computing platform provides platform information to a developer.

The center computing platform provides, to the developer, information indicating an identity of an end edge computing platform, a device type, a device model, a device function, a location, and the like that are in a terminal device that can be connected to or has been connected to and managed by the platform. The center computing platform also provides, to the developer, registration information of the end edge computing platform indicating an access network device, a gateway, or a storage device controlled by a network edge computing platform that can be connected to or has been connected to and managed by the platform. The registration information of the end edge computing platform may be obtained in the registration process shown in FIG. 4; or may be the registration information preset by the center computing platform, and the registration information may support the end edge computing platform in the terminal device. The device type may enable the developer to obtain usage of the device; the device model may enable the developer to obtain available computing, storage, and communication capabilities of the device, to develop application programs for services; the device function may enable the developer to finish a service requirement by invoking each function module of the device through the application programs that run on platforms; and the location information may enable the developer to perform, in the application programs based on the service requirement, associations between application program components on the end edge computing platform in each terminal device, and between the application program component of the end edge computing platform and the application program component of the network edge computing platform or of the center computing platform that are in the terminal device. The access network device and the gateway information may enable the developer to control data transmission in the application programs based on the service requirement. The storage device information may enable the developer to control storage and reading of data in the application programs based on the service requirement. The device information may be provided to the developer in a form of API, but not limited to the form.

Besides, the center computing platform may alternatively provide, to the developer, through the API, topology information (a location and mapping relationship) between the end edge computing platform and the network edge computing platform or the center computing platform that are of the terminal device that has been connected to or managed by the platform, for example, a deployment location of the end edge computing platform in the terminal device. The developer may generate, or deploy application program components of a global application program on the platforms based on the topology information. The developer may further adjust the deployment of a process, an event trigger, an execution action, or an algorithm module of the application program components on the platforms. The center computing platform may automatically generate or deploy the application program components based on device information and the topology information, for example, when an end edge computing platform of a terminal device is registered online, if a preset condition of a deployment location is satisfied, an application program component that runs on the end edge computing platform is generated and sent to the end edge computing platform and an involved network edge computing platform.

Operation 502: The center computing platform generates an application program component.

The center computing platform generates a global application program, the global application program may include an application program component of the center computing platform, 0 to a plurality of application program components of the network edge computing platform, and one or more application program components of the end edge computing platform. The center computing platform allocates identities to the application program component of the center computing platform, the application program component of the network edge computing platform, and the application program component of the end edge computing platform; associates an application program component identity of the center computing platform, an application program component identity of the network edge computing platform, and an application program component identity of the end edge computing platform with each other, and with an identity of a platform that runs a corresponding application program component. For example, the application program component identity of the center computing platform is associated with an identity of the center computing platform. During implementation, a common application program component that finishes a particular function may be deployed on different platforms. In this case, the common application program component identity may be associated with the identity of the center computing platform, an identity of the network edge computing platform, or an identity of the end edge computing platform that is set to run the application program component.

The center computing platform allocates an identity to an instance corresponding to the global application program, installs the application program component of the center computing platform, creates an application program component instance of the center computing platform, allocates an application program component instance identity of the center computing platform, and is associated with an instance identity corresponding to the global application program.

The center computing platform registers an application program component instance parameter and/or communications model of the center computing platform on a center platform interface module shown in the foregoing FIG. 1A and FIG. 1B, so that application program component instances that run on the center computing platform communicate with application program component instances that run on other platforms by using a public interface module. Information included in the application program component instance parameter and communications model is described in the foregoing embodiments. Details are not described again.

Operation 503: The center computing platform sends application program component information to the network edge computing platform.

The center computing platform sends the application program component information to the network edge computing platform, and the application program component information may include an application program component packet of the network edge computing platform, and an application program component packet of the end edge computing platform. The component packet of the network edge computing platform may include the identity of the network edge computing platform, the application program component that runs on the network edge computing platform, and the application program component identity of the network edge computing platform; and the application program component packet of the end edge computing platform may include the identity of the end edge computing platform, the application program component that runs on the end edge computing platform and the application program component identity. The application program component information may further include the application program component instance parameter and/or communications model that runs on the center computing platform and that is registered on the center platform interface module; or may further include one or more of the identity of the center computing platform, an instance identity corresponding to the global application program, the application program component identity of the center computing platform, and the application program component instance identity of the center computing platform.

Operation 504: The network edge computing platform installs the application program component.

The network edge computing platform installs the application program component of the network edge computing platform, creates an application program component instance of the network edge computing platform, allocates an application program component instance identity of the network edge computing platform, and associates the application program component instance identity of the network edge computing platform with one or more of the instance identity corresponding to the global application program, the application program component identity of the center computing platform, the application program component instance identity of the center computing platform, and the identity of the center computing platform.

The network edge computing platform registers an application program component instance parameter and/or communications model of the network edge computing platform on a network platform interface module 2 shown in the foregoing FIG. 1A and FIG. 1B, so that application program component instances that run on the network edge computing platform communicate with application program component instances that run on the center computing platform or other network edge computing platforms by using the public interface module. The network edge computing platform registers the application program component instance parameter and/or communications model of the network edge computing platform on a network platform interface module 1 shown in the foregoing FIG. 1A and FIG. 1B, so that application program component instances that run on the network edge computing platform communicate with application program component instances that run on the end edge computing platform by using the public interface module. The application program component instance parameter and communications model are described in the foregoing embodiments. Details are not described again.

Operation 505: The network edge computing platform sends the application program component information to the end edge computing platform.

The network edge computing platform sends the application program component information to the end edge computing platform. The application program component information may include the application program component packet of the end edge computing platform. The application program component packet of the end edge computing platform may include the identity of the end edge computing platform, the application program component that runs on the end edge computing platform, and the application program component identity; and the application program component information may further include the application program component instance parameter and/or communications model that are/is of the network edge computing platform and that are/is registered on the network platform interface module 1. The application program component information may further include one or more of the identity of the center computing platform, the instance identity corresponding to the global application program, the application program component identity of the center computing platform, the application program component instance identity of the center computing platform, the application program component identity of the network edge computing platform, and the application program component instance identity of the network edge computing platform.

Operation 506: The end edge computing platform installs the application program component.

The end edge computing platform installs the application program component of the end edge computing platform, creates an application program component instance of the end edge computing platform, allocates an application program component instance identity of the end edge computing platform, and associates the application program component instance identity of the end edge computing platform with one or more of the identity of the center computing platform, the identity of the network edge computing platform, the instance identity corresponding to the global application program, the application program component identity of the center computing platform, the application program component instance identity of the center computing platform, the application program component identity of the network edge computing platform, and the application program component instance identity of the network edge computing platform.

The end edge computing platform registers an application program component instance parameter and/or communications model of the end edge computing platform on an end platform interface module shown in FIG. 1A and FIG. 1B, so that application program component instances that run on the end edge computing platform communicate with application program component instances that run on the network edge computing platform by using the public interface module. The application program component instance parameter and communications model are described in the foregoing embodiments. Details are not described again.

Operation 507: The end edge computing platform sends response information.

The end edge computing platform sends the response information to the network edge computing platform. The response information may include the application program component instance parameter and/or communications model that are/is of the end edge computing platform and that are/is registered on the end platform interface module. The response information may further include one or more of a process instance ID, an event trigger instance ID, an execution action instance ID, an algorithm instance ID, and a corresponding process ID, event trigger ID, execution action ID, and algorithm ID that are in the application program component instance of the end edge computing platform. The response information may further include a binding relationship between the application program component instance identity of the end edge computing platform and at least one of the identity of the center computing platform, the identity of the network edge computing platform, the instance identity corresponding to the global application program, the application program component identity of the center computing platform, the application program component instance identity of the center computing platform, the application program component identity of the network edge computing platform, and the application program component instance identity of the network edge computing platform.

Operation 508: The network edge computing platform sends response information.

The network edge computing platform sends the response information to the center edge computing platform. The response information may include the application program component instance parameter and/or communications model that are/is of the network edge computing platform and that are/is registered on the network platform interface module 2. The response information may further include the application program component instance of the end edge computing platform and one or more of a process instance ID, an event trigger instance ID, an execution action instance ID, an algorithm instance ID, and a corresponding process ID, event trigger ID, execution action ID, and algorithm ID that are in the application program component instance of the network edge computing platform. The response information may further include a binding relationship between the application program component instance identity of the network edge computing platform, the application program component instance identity of the end edge computing platform and at least one of the identity of the center computing platform, the identity of the network edge computing platform, the instance identity corresponding to the global application program, the application program component identity of the center computing platform, the application program component instance identity of the center computing platform, the application program component identity of the network edge computing platform, and the application program component instance identity of the network edge computing platform, and a binding relationship between the application program component instance identity of the network edge computing platform, the application program component instance identity of the end edge computing platform and the network edge computing platform and the end edge computing platform. It should be noted that the process instance ID, the event trigger instance ID, the execution action instance ID, and the algorithm instance ID that are in operations 507 and 508 are program segments of this type of module that actually run in the application program component instance, and identify a location of the function that runs in the application program component instance. The process ID, the event trigger ID, the execution action ID, and the algorithm ID are program segments that run in the application program, and identify a logical function of this type of module. The foregoing module that runs on one application program component instance may be replaced with different logical modules of this type.

The center computing platform establishes a topology diagram of the application program components and instances that are deployed on the end edge computing platform, the network edge computing platform, and the center computing platform based on the response information, and provides information for managing, maintaining, and updating the installed application program component instance and for installing the application program component in a new online terminal device.

The network edge computing platform may perform transmission scheduling based on data transmission requirements of the application program component instance that runs on the network edge computing platform and the application program component instance that runs on a connected end edge computing platform, and an available access network resource. The data transmission requirements may be determined by one piece or a combination of a plurality of pieces of information such as: a heartbeat message, application program signaling, media data, a data packet specification, whether a receive end needs to reply, response time validity (the latest time period), priority, and the like that are in the communications model.

In the process of managing an application program shown in the foregoing FIG. 3, after a first edge computing platform deploys the application program, the first edge computing platform may obtain an application program event report, and generate an application program component of the first edge computing platform and/or an application program component of a second edge computing platform based on the application program event report. Generating the application program component of the first edge computing platform and/or the application program component of the second edge computing platform may be performed before obtaining the application program event report, and the first edge computing platform does not have the application program component of the first edge computing platform and/or the application program component of the second edge computing platform. The first edge computing platform generates the application program component of the first edge computing platform and/or the application program component of the second edge computing platform based on the application program event report; the generating the application program component of the first edge computing platform and/or the application program component of the second edge computing platform may be performed before obtaining the application program event report, and the first edge computing platform has the application program component of the first edge computing platform and/or the application program component of the second edge computing platform. In this case, the first edge computing platform needs to update the application program component of the first edge computing platform and/or the application program component of the second edge computing platform. This embodiment is merely an example, and is not limited thereto. For example, an application program component A1 runs on the first edge computing platform; if the first edge computing platform learns of, based on the obtained application program event report, that an application program component B1 needs to be generated, the first edge computing platform directly generate the application program component B1; if the first edge computing platform learns of, based on the obtained application program event report, that the application program component A1 needs to be updated, the first edge computing platform generates a new application program component A1, to finish updating.

In one embodiment, after obtaining the application program event report, the foregoing first edge computing platform may alternatively generate an application program component module corresponding to an application program component instance identity of the first edge computing platform and/or an application program component module corresponding to an application program component instance identity of the second edge computing platform based on the application program event report, where the application program component module includes one or more of a process module, an event trigger module, an execution action module, or an algorithm module. The process in which the first edge computing platform generates the application program component module corresponding to the application program component instance identity of the first edge computing platform and/or the application program component module corresponding to the application program component instance identity of the second edge computing platform is similar to the process in which the foregoing first edge computing platform generates the application program component of the first edge computing platform and/or the application program component of the second edge computing platform based on the application program event report. Details are not described again.

After the first edge computing platform generates the application program component of the second edge computing platform or the application program component module corresponding to the application program component instance identity of the second edge computing platform based on the application program event report, the first edge computing platform sends the generated application program component of the second edge computing platform or the application program component module corresponding to the application program component instance identity of the second edge computing platform to the second edge computing platform.

To clearly explain the foregoing process of generating an application program component, the following uses application program component update as an example, to describe the process in which the first edge computing platform updates the application program component based on the application program event report. The application program update may be triggered by the developer, and when the developer updates service logic, the application program update on the platform is triggered.

Figure 6:
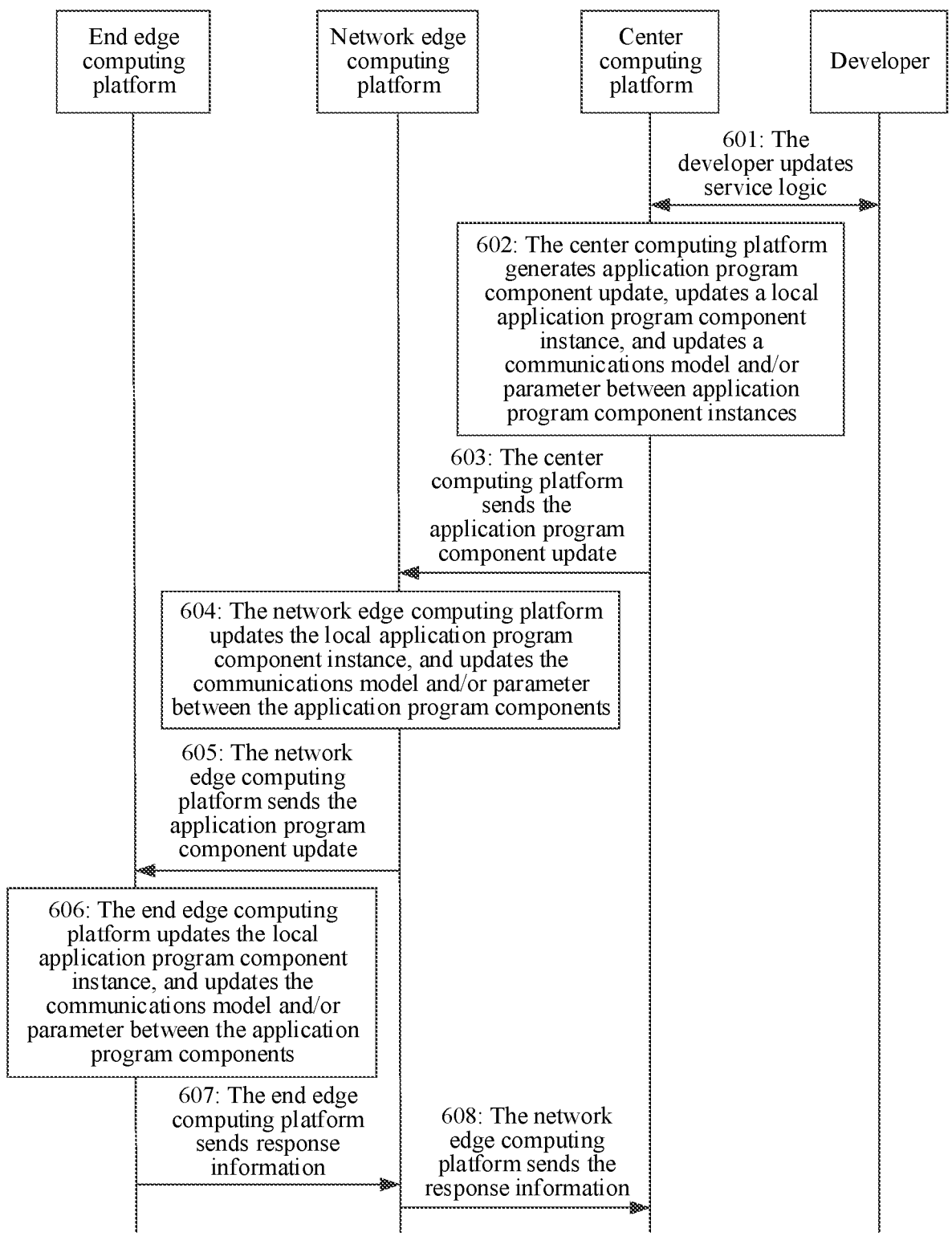
FIG. 6 is a schematic flowchart of updating an application program according to an embodiment of this application.

For example, FIG. 6 shows a process of updating an application program, and the process includes the following operations.

Operation 601: A developer updates service logic.

The developer updates the service logic based on the topology deployed by the foregoing application program.

Operation 602: A center computing platform generates application program component update, updates a local application program component instance, and updates a communications model and/or parameter between application program components.

Operation 603: The center computing platform sends the application program component update.

Operation 604: A network edge computing platform updates the local application program component instance, and updates the communications model and/or parameter between the application program components.

Operation 605: The network edge computing platform sends the application program component update.

Operation 606: An end edge computing platform updates the local application program component instance, and updates the communications model and/or parameter between the application program components.

Operation 607: The end edge computing platform sends response information.

Operation 608: The network edge computing platform sends the response information.

Update in this embodiment is performed based on a deployed and installed application program component instance, and the process of the foregoing operation 602 to operation 608 is similar to operations 502 to 508 in the process shown in FIG. 5. A detailed process is not described again.

The update in this embodiment may be update of the application program component instance that runs on the end edge computing platform and update of the application program component instance that runs on the network edge computing platform. The update may further be the update of the application program component instance that runs on the end edge computing platform and the application program component module such as a process instance, an event trigger instance, an execution action instance, or an algorithm instance that runs in the application program component instance of the network edge computing platform. When the application program component module is updated, the network edge computing platform sends, to the end edge computing platform, one or more of a process instance ID, a new process ID, and a process module, an event trigger instance ID, a new event trigger ID, and an event trigger module, an execution action instance ID, a new execution action ID, and an execution action module, or an algorithm instance ID, a new algorithm ID, and an algorithm module that are corresponding to an application program component instance ID that is of the end edge computing platform and that needs to be updated.

When the foregoing first edge computing platform obtains an application program event report, the first edge computing platform may obtain an application program event report sent from the second edge computing platform, or the first edge computing platform may obtain an application program event report generated locally. That is, places triggered by an application program event are different, and the places may be triggered by the first edge computing platform or may be triggered by the second edge computing platform.

Figure 7:
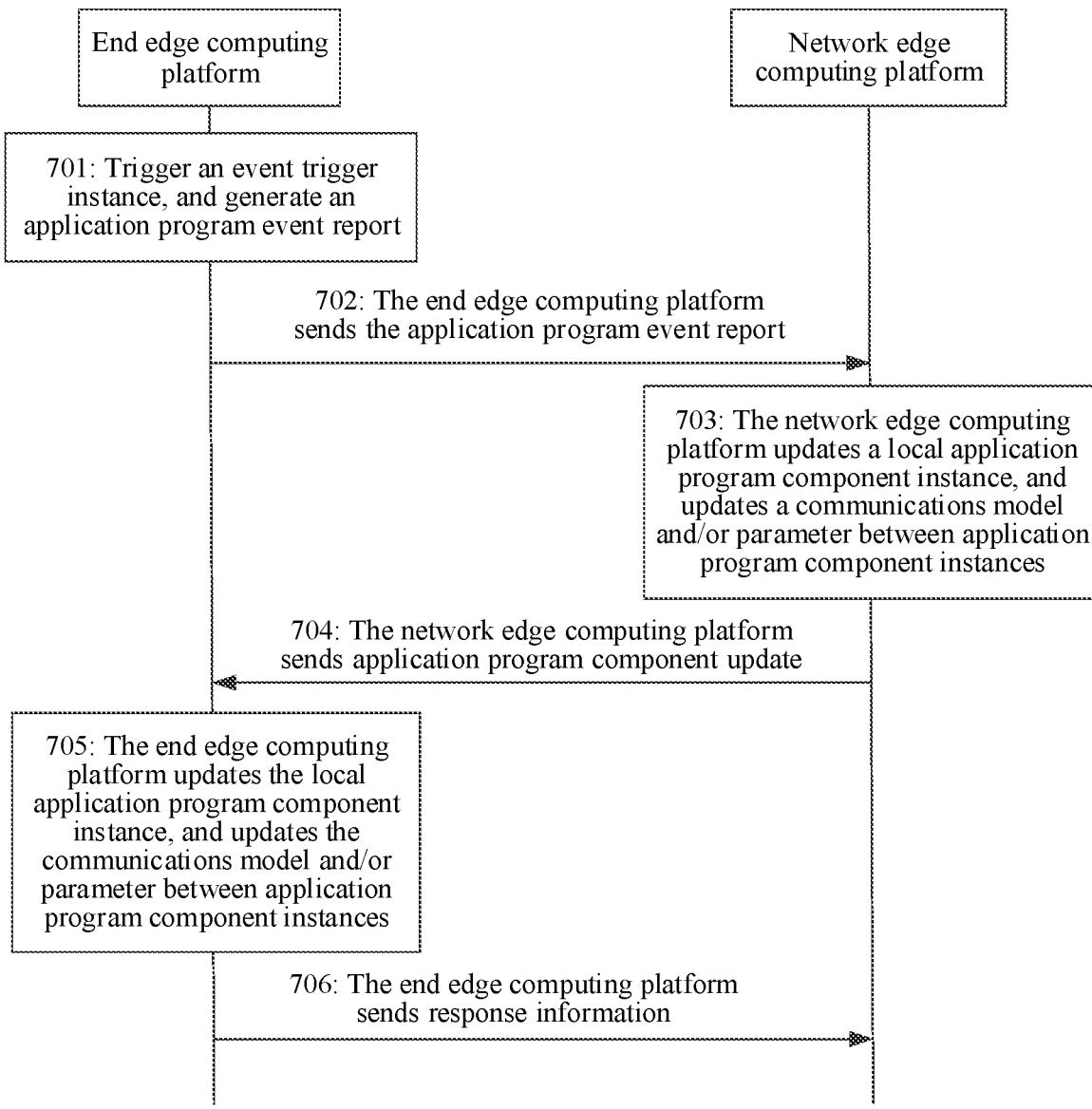
FIG. 7 is a schematic flowchart of updating an application program according to an embodiment of this application.

For example, FIG. 7 shows an update process, the process finishes updating the process module, the event trigger module, the execution action module, or the algorithm module of the application program component, and the process may be triggered when a condition of the event trigger instance in the installed application program component instance in the end edge computing platform is satisfied. This embodiment takes this to describe. The process may be triggered when a condition of the event trigger instance in the installed application program component instance in the network edge computing platform is satisfied. This embodiment is described by using a two-level platform structure, and also applicable to a three-level platform structure. In a three-level platform, the process may further be triggered when a condition of the event trigger instance in the installed application program component instance in the center computing platform is satisfied.

The process includes the following operations.

Operation 701: Trigger an event trigger instance, and generate an application program event report.

The event trigger instance in the installed application program component instance in the end edge computing platform is triggered because of satisfying a trigger condition. The trigger condition may be that data generated when the application program component instance runs reaches a threshold set by the event trigger instance, or may be that data of communication between an end function controller in the end edge computing platform and another independent software and hardware function module in a terminal device that are in FIG. 1A and FIG. 1B, and FIG. 2a to FIG. 2c reaches the threshold set by the event trigger instance.

The foregoing event trigger instance trigger may further be that the event is triggered when the condition of the event trigger instance in the installed application program component instance in the network edge computing platform is satisfied. The condition of triggering the event trigger instance may be that data of communication between a network function controller and a gateway or a storage device that are shown in FIG. 1A and FIG. 1B and that are in the network edge computing platform, or data of communication between a network function controller and an access network device that are in the network edge computing platform reaches the threshold set by the event trigger instance.

In the three-level platform structure, the event may further be triggered when the condition of the event trigger instance in the installed application program component instance in the center edge computing platform is satisfied, and the condition of triggering the event trigger instance may be that data of communication between a center controller and a gateway or a storage device that are in the center computing platform and that are shown in FIG. 1A and FIG. 1B reaches the threshold set by the event trigger instance.

Operation 702: The end edge computing platform sends the application program event report.

The end edge computing platform sends the application program event report to the network edge computing platform, and the application program event report may include information such as an identity of the end edge computing platform, an application program component instance ID, an event trigger instance ID, or event data.

Operation 703: The network edge computing platform updates the application program component instance of the network edge computing platform, and updates a communications model and/or parameter between application program components.

The network edge computing platform processes the application program event report, and generates an updated application program component instance, or process, event trigger, execution action, or algorithm module. The network edge computing platform installs an updated local application program component instance, or process, event trigger, execution action, or algorithm module. The network edge computing platform updates an application program component instance parameter and/or communications model on the network platform interface module 2 shown in FIG. 1A and FIG. 1B.

Operation 704: The network edge computing platform sends application program component update.

The network edge computing platform sends an application program component instance or process, event trigger, execution action, or algorithm module used for update to the end edge computing platform. The network edge computing platform may alternatively send the identity of the end edge computing platform, an application program component instance ID, and a new application program component packet, a process instance ID, a new process ID, and a process module, an event trigger instance ID, a new event trigger ID, and an event trigger module, an execution action instance ID, an execution action ID, and an execution action, or an algorithm instance ID, an algorithm ID, and an algorithm module that are corresponding to an application program component instance ID to the end edge computing platform.

Operation 705: The end edge computing platform updates an application program component instance of the end edge computing platform, and updates the communications model and/or parameter between application program components.

The end edge computing platform installs the updated local application program component instance, or process, event trigger, execution action, or algorithm module. The end edge computing platform updates the application program component instance parameter and/or communications model on the end platform interface module.

Operation 706: The end edge computing platform sends response information.

The end edge computing platform sends the response information to the network edge computing platform, and the operation is similar to operation 507 in FIG. 5. Details are not described again.

The end edge computing platform executes a new application program component instance, or process, event trigger, execution action, or algorithm module.

To better combine with an MEC platform established by the standardization organization, an overall module of an edge computing platform in this application may further be mapped to the MEC platform, where the network edge controller of the network edge computing platform or the center controller in the center computing platform, the network platform interface module 1/2, and the center platform interface module may be a part of a mobile edge platform in the MEC platform; the application program component instance is an instance in ME App; and other functions of the network edge computing platform and the center computing platform are a part of a mobile edge platform manager or a mobile edge orchestrator. The network edge computing platform or the center computing platform may further be a part of the mobile edge platform. An E2/E3 interface is transmitted on an Mp3 interface.

Figure 8:
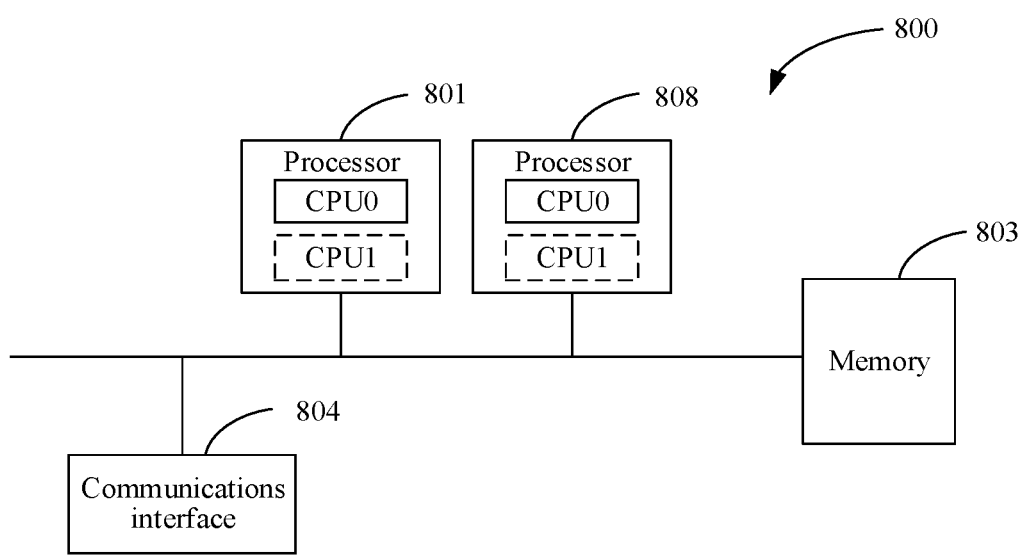
FIG. 8 is a schematic structural diagram of a device for managing an application program according to an embodiment of this application.

Based on a same technical conception, FIG. 8 is a schematic structural diagram of a device for managing an application program according to this application. A device 800 for managing an application program may be a device of a core network side on which a center data center 101 is located in FIG. 1A and FIG. 1B, a device of an access network side on which an edge data center 102 is located, or a terminal device 103. The center data center 101 is deployed with a center computing platform 1011, the edge data center 102 is deployed with a network edge computing platform 1021, and the terminal device 103 is deployed with an end edge computing platform 1031. The center computing platform 1011, the network edge computing platform 1021, and the end edge computing platform 1031 may be logical units, or may be physical units. The device 800 for managing the application program may be configured to: perform the method described in the foregoing embodiments, and perform any method for managing the application program in the foregoing embodiments. The device 800 for managing the application program includes at least one processor 801, at least one communications interface 804, and, further includes a memory 803.

The processor 801 may be a general central processing unit (CPU), a microprocessor, an application-specific integrated circuit (ASIC), or one or more integrated circuits configured to control execution of a program in this application.

The memory 803 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another compact disc storage medium, optical disc storage medium (including a compact disc, a laser disc, an optical disc, a digital versatile disc, a Blu-ray disc, or the like) and magnetic disk storage medium, another magnetic storage device, or any other medium that can be configured to carry or store desired program code in the form of an instruction or a data structure and that is accessible to a computer, but is not limited thereto. The memory 803 may independently exist and is connected to the processor 801 by using the bus. The memory 803 may alternatively be integrated in the processor 801.

The memory 803 is configured to store application program code for execution of this application, and the execution is controlled by the processor 801. The processor 801 is configured to execute the application program code stored in the memory 803.

In an implementation, in an embodiment, the processor 801 may include one or more CPUs, for example, a CPU 0 and a CPU 1 in FIG. 8.

During the implementation, in an embodiment, the device 800 for managing the application program may include a plurality of processors, for example, a processor 801 and a processor 808 in FIG. 8. Each of the processors may be a single-core (single-CPU) processor or a multi-core (multi-CPU) processor. The processor herein may refer to one or more devices, circuits, and/or processing cores configured to process data (such as a computer program instruction).

Exemplarily, when the device 800 for managing the application program shown in FIG. 8 is the device on the core network side on which the center data center 101 is located shown in FIG. 1A and FIG. 1B or the device at the access network side on which the edge data center 102 is located, a memory of the device 800 for managing the application program stores one or more software modules. The device 800 for managing the application program may implement software modules through the processor 801 and program code stored in the memory 803. As an example, the processor 801 may implement the process performed by a first edge computing platform in any embodiment of this application.

When the device 800 for managing the application program shown in FIG. 8 is the terminal device 103 shown in FIG. 1A and FIG. 1B, the memory 803 in the device for managing the application program stores one or more software modules. The device 800 for managing the application program may implement the software modules through the processor 801 and program code stored in the memory 803. As an example, the processor 801 may implement the process performed by a second edge computing platform in any embodiment of this application.

In this application, functional module division may be performed on the device for managing the application program based on the foregoing method example. For example, functional modules may be divided corresponding to the functions. Alternatively, two or more functions may be integrated into a processing module. The integrated module may be implemented in a form of hardware, or may be implemented in a form of a software functional module. It should be noted that, in this application, module division is exemplary, and is merely a logical function division. In actual implementation, another division manner may be used.

For example, the device for managing the application program may include a processing unit and a communications unit, the processing unit and the communications unit can perform the operation performed by the first edge computing platform or the second edge computing platform in the foregoing any embodiment.

It should be noted that the device for managing the application program in this application may further be the MEC platform established by the standardization organization, and the device implements the method for managing the application program shown in the foregoing any embodiment through the mobile edge platform in the MEC platform.

Variation manners and specific examples of the method for managing the application program in the foregoing embodiment are also applicable to the device for managing the application program in this embodiment. According to the foregoing detailed description about the method for managing the application program, a person skilled in the art may clearly know an implementation method of the device for managing the application program in this embodiment, and therefore, to make the specification concise, details are not described herein again.

This application further provides a computer storage medium, configured to store a computer software instruction used by the device for managing the application program shown in FIG. 8. The computer storage medium contains program code designed for executing the foregoing method embodiment.

This application further provides a computer program product. The computer program product includes a computer software instruction, and the computer software instruction may be loaded by using a processor to implement the methods in the foregoing method embodiments.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method of managing a global application program in a communications network, comprising: obtaining, by a first edge computing platform of the communications network, a first application program component of the first edge computing platform and a second application program component of a second edge computing platform of the communications network from a center computing platform located in a core network of the communications network, wherein each of the first application program component and the second application program component is an application program component in the global application program, wherein the first edge computing platform is located in a network device on an access network of the communications network and the second edge computing platform is located in a terminal device of the communications network: creating, by the first edge computing platform, an instance of the first application program component, and allocating an identity to the instance of the first application program component: sending, by the first edge computing platform, the second application program component and an identity of an instance of the global application program to the second edge computing platform; and associating, by the first edge computing platform, the identity of the instance of the global application program, an identity of the instance of the first application program component of the first edge computing platform, an identity of the second edge computing platform;

after sending the second application program component to the second edge computing platform obtaining, by the first edge computing platform, an application program event report; and generating, by the first edge computing platform based on the application program event report, one or more of an application program component module corresponding to the identity or an application program component module corresponding to an identity of an instance of the second application program component of the second edge computing platform, wherein each of the one or more application program component modules comprises at least one of a process module, an event trigger module, an execution action module, and an algorithm module.

2. The method according to claim 1, further comprising: before obtaining the first application program component and the second application program component, obtaining, by the first edge computing platform, registration information of the second edge computing platform, wherein the registration information comprises one piece of the following information or any combination thereof: an identity of the second edge computing platform, a type of a device in which the second edge computing platform is located, a model of the device a capability of the device, a function of the device, a communications module identity of the device, and location information of the device in a network.

3. The method according to claim 1, wherein the identity of the instance the global application program is allocated by the first edge computing platform.

4. The method according to claim 1, further comprising: after creating the instance of the first application program component, registering, by the first edge computing platform, one or more of a parameter of the instance of the first application program component, or a communications model of the first edge computing platform, wherein the parameter comprises one piece of the following information or any combination thereof: a name, a length, and a value range; and wherein the communications model comprises one piece of the following information or any combination thereof: heartbeat information, application program signaling, media data, a data packet specification, whether a receive end needs to reply, response time validity, and priority information; and sending, by the first edge computing platform, one or more of the parameter or the communications model to the second edge computing platform.

5. The method according to claim 1, further comprising: after sending the second application program component to the second edge computing platform, receiving, by the first edge computing platform, first response information from the second edge computing platform, wherein the first response information comprises one or more of a parameter of the instance of the first application program component or a communications model of the second edge computing platform.

6. The method according to claim 5, further comprising: after receiving the first response information from the second edge computing platform, performing, by the first edge computing platform, an adjustment on application program components or resource scheduling on the access network based on one or more of parameters of application program component instances or communications models of the first edge computing platform and the second edge computing platform.

7. The method according to claim 1, further comprising: after sending the second application program component to the second edge computing platform, receiving, by the first edge computing platform, second response information from the second edge computing platform, wherein the second response information comprises at least one of a process instance identity (ID), a process ID, an event trigger instance ID, an event trigger ID, an execution action instance ID, an execution action ID, an algorithm instance ID, and an algorithm ID that are in the second application program component of the second edge computing platform.

8. The method according to claim 1, further comprising: after sending the second application program component to the second edge computing platform, obtaining, by the first edge computing platform, an application program event report; and generating, by the first edge computing platform, one or more of the first application program component or the second application program component based on the application program event report.

9. The method according to claim 8, wherein the obtaining of the application program event report comprises: obtaining, by the first edge computing platform, the application program event report from the second edge computing platform; or obtaining, by the first edge computing platform, the application program event report, generated by the first edge computing platform after an event trigger instance in the instance of the first application program component satisfies a first trigger condition.

10. A device for managing a global application program in a communications network, the device being a first edge computing platform of the communications network, and comprising: a memory; and a processor; wherein the memory is configured to store program instructions, which, when executed by the processor, cause the processor to perform operations comprising: obtaining a first application program component of the first edge computing platform and a second application program component of a second edge computing platform of the communications network from a center computing platform located in a core network of the communications network, wherein each of the first application program component and the second application program component is an application program component in the global application program, wherein the first edge computing platform is located in a network device on an access network of the communications network and the second edge computing platform is located in a terminal device of the communications network, creating an instance of the first application program component, and allocating an identity to the instance of the first application program component, sending the second application program component and an identity of an instance of the global application program to the second edge computing platform, winch installs the second application program component thereon, and associating the identity of the instance of the global application program, an identity of the instance of the first application program component of the first edge computing platform, an identity of the second edge computing platform;

after sending the second application program component to the second edge computing platform obtaining, by the first edge computing platform, an application program event report; and generating, by the first edge computing platform based on the application program event report, one or more of an application program component module corresponding to the identity of the instance of the first application program component of the first edge computing platform, or an application program component module corresponding to an identity of an instance of the second application program component of the second edge computing platform, wherein each of the one or more application program component modules comprises at least one of a process module, an event trigger module, an execution action module, and an algorithm module.

11. The device according to claim 10, the operations further comprising: obtaining registration information from the second edge computing platform before obtaining the first application program component and the second application program component, wherein the registration information comprises one piece of the following information or any combination thereof: an identity of the second edge computing platform, a type of a device in which the second edge computing platform is located, a model of the device, a capability of the device, a function of the device, a communications module identity of the device, and location information of the device in a network.

12. The device according to claim 10, wherein the identity of the instance the global application program is allocated by the first edge computing platform.

13. The device according to claim 10, the operations further comprising: receiving first response information from the second edge computing platform after sending the second application program component to the second edge computing platform, wherein the first response information comprises one or more of a parameter of the instance of the first application program component or a communications model of the second edge computing platform.

14. The device according to claim 10, the operations further comprising: receiving second response information from the second edge computing platform after sending the second application program component to the second edge computing platform, wherein the second response information comprises at least one of a process instance identity ID, a process ID, an event trigger instance ID, an event trigger ID, an execution action instance ID, an execution action ID, an algorithm instance ID, and an algorithm ID that are in the second application program component of the second edge computing platform.

15. The device according to claim 10, the operations further comprising: obtaining an application program event report after sending the second application program component to the second edge computing platform; and generating the first application program component and the second application program component based on the application program event report.

16. The device according to claim 10, the operations further comprising: obtaining an application program event report after sending the second application program component to the second edge computing platform; and generating one or more of an application program component module corresponding to the identity of the instance of the first application program component of the first edge computing platform, or an application program component module corresponding to an identity of an instance of the second application program component of the second edge computing platform, wherein each of the one or more application program component modules comprises at least one of a process module, an event trigger module, an execution action module, and an algorithm module.

17. A non-transitory computer readable medium storing program instructions for managing a global application program in a communications network, which program instructions, when executed by a processor, cause the processor to perform operations comprising: obtaining a first application program component of a first edge computing platform of the communications network and a second application program component of a second edge computing platform of the communications network from a center computing platform located in a core network of the communications network, wherein each of the first application program component and the second application program component is an application program component in the global application program, wherein the first edge computing platform is located in a network device on an access network of the communications network and the second edge computing platform is located in a terminal device of the communications network, creating an instance of the first application program component, and allocating an identity to the instance of the first application program component, sending the second application program component and an identity of an instance of the global application program to the second edge computing platform, which installs the second application program component thereon, and associating the identity of the instance of the global application program, an identity of the instance of the first application program component of the first edge computing platform, an identity of the second edge computing platform;

after sending the second application program component to the second edge computing platform obtaining, by the first edge computing platform, an application program event report; and generating, by the first edge computing platform based on the application program event report, one or more of an application program component module corresponding to the identity of the instance of the first application program component of the first edge computing platform, or an application program component module corresponding to an identity of an instance of the second application program component of the second edge computing platform, wherein each of the one or more application program component modules comprises at least one of a process module, an event trigger module, an execution action module, and an algorithm module.

18. The non-transitory computer readable medium according to claim 17, the operations further comprising: obtaining registration information from the second edge computing platform before obtaining the first application program component and the second application program component, wherein the registration information comprises one piece of the following information or any combination thereof: an identity of the second edge computing platform, a type of a device in which the second edge computing platform is located, a model of the device, a capability of the device, a function of the device, a communications module identity of the devices and location information of the device in a network.

* * * * *

UNITED STATES PATENT AND TRADEMARK OFFICE
CERTIFICATE OF CORRECTION

PATENT NO. : 11,307,914 B2
APPLICATION NO. : 16/823047
DATED : April 19, 2022
INVENTOR(S) : Weisheng Jin Page 1 of 1

It is certified that error appears in the above-identified patent and that said Letters Patent is hereby corrected as shown below:

In the Claims

In Claim 1, Column 34, Line 44, "wherein each of the one of more application" should be --wherein each of the one or more application--.

In Claim 10, Column 36, Line 14-15, "winch installs the second application program" should be --which installs the second application program--.

In Claim 18, Column 38, Line 40, "identity of the devices and location" should be --module identity of the device, and location--.

Signed and Sealed this
Thirtieth Day of August, 2022

Katherine Kelly Vidal
*Director of the United States Patent and Trademark Office*